(12) United States Patent
Zee et al.

(10) Patent No.: US 11,350,342 B1
(45) Date of Patent: May 31, 2022

(54) NETWORK NODE AND METHOD THEREIN IN A RADIO COMMUNICATIONS NETWORK

(71) Applicant: Telefonaktiebolaget LM Ericsson (publ), Stockholm (SE)

(72) Inventors: Oscar Zee, Stockholm (SE); Ulf Eric Andretzky, Huddinge (SE); Dan Gren, Upplands Väsby (SE); Gino Masini, Stockholm (SE); Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/610,078

(22) PCT Filed: Aug. 29, 2017

(86) PCT No.: PCT/SE2017/050864
§ 371 (c)(1),
(2) Date: Nov. 1, 2019

(87) PCT Pub. No.: WO2018/217146
PCT Pub. Date: Nov. 29, 2018

(30) Foreign Application Priority Data

May 23, 2017 (WO) .................. PCT/SE2017/05044

(51) Int. Cl.
*H04W 4/00* (2018.01)
*H04W 40/36* (2009.01)
(Continued)

(52) U.S. Cl.
CPC ......... *H04W 40/36* (2013.01); *H04L 41/5077* (2013.01); *H04W 36/0055* (2013.01); *H04W 76/12* (2018.02)

(58) Field of Classification Search
None
See application file for complete search history.

(56) References Cited

U.S. PATENT DOCUMENTS

2011/0271002 A1 11/2011 Martinez et al.
2014/0079049 A1* 3/2014 Friman .................. H04W 40/02
370/338

FOREIGN PATENT DOCUMENTS

WO 2016095998 A1 6/2016
WO 2016134752 A1 9/2016
(Continued)

OTHER PUBLICATIONS

International Search Report and Written Opinion for International Application No. PCT/SE2017/050864, dated Feb. 9, 2018, 9 pages.
(Continued)

*Primary Examiner* — Suhail Khan
(74) *Attorney, Agent, or Firm* — NDWE LLP

(57) ABSTRACT

A method performed by a network node to change a transport path for a user plane session in a radio communications network. The path prolongs along a first part between an antenna endpoint of a network node and a Packet Processing Function (PPF) instance serving the network node and a second part between the PPF instance and a Core Network (CN) endpoint. The network node identifies available CN endpoints in a CN, available PPF instances in a Radio Access Network (RAN) and of available antenna endpoints in the RAN that are available for the user plane session and comprises a number of possible transport paths for the user plane session. When detecting a change event related to the user plane session, the network node controls whether or not to change the transport path to any of the a number of possible transport paths for the user plane session.

19 Claims, 29 Drawing Sheets

(51) Int. Cl.
*H04W 76/12* (2018.01)
*H04W 36/00* (2009.01)
*H04L 41/50* (2022.01)

(56) References Cited

FOREIGN PATENT DOCUMENTS

| WO | 2016192636 A1 | 12/2016 |
| WO | 2016192639 A1 | 12/2016 |

OTHER PUBLICATIONS

International Preliminary Report on Patentability for International Application No. PCT/SE2017/050864, dated Dec. 5, 2019, 7 pages.
International Search Report and Written Opinion for International Application No. PCT/SE2017/050544, dated Feb. 9, 2018, 10 pages.
International Preliminary Report on Patentability for International Application No. PCT/SE2017/050544, dated Dec. 5, 2019, 7 pages.
3GPP TR 23.799 V1.2.0, "3rd Generation Partnership Project; Technical Specification Group Services and System Aspects; Study on Architecture for Next Generation System (Release 14)," Nov. 2016, 3GPP Organizational Partners.
Communication pursuant to Article 94(3) EPC for EP Application No. 17729569.8, dated Mar. 19, 2020, 7 pages.

\* cited by examiner

NETWORK NODE AND METHOD THEREIN IN A RADIO COMMUNICATIONS NETWORK

CROSS-REFERENCE TO RELATED APPLICATIONS

This application is a National stage of International Application No. PCT/SE2017/050864, filed Aug. 29, 2017, which claims priority to International Application No. PCT/SE2017/050544, filed May 23, 2017, which are all hereby incorporated by reference.

TECHNICAL FIELD

Embodiments herein relate to a network node and methods therein. In particular, they relate to controlling whether or not to change a transport path for a user plane session in a radio communications network (100).

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a network node such as a radio access node e.g., a Wi-Fi access point or a radio base station (RBS), which in some networks may also be denoted, for example, a "NodeB" or "eNodeB". A service area or cell area is a geographical area where radio coverage is provided by the network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

As mentioned above, the 3GPP is currently working on standardization of the 5th generation of radio access system, which also is referred to as New Radio (NR). A Radio Control Function (RCF) is in this example included in a Radio Control Node (RCN). An evolved architecture for the RAN is foreseen, both for LTE Evolution and New Radio tracks of 5G. This includes a solution where radio base stations may be split into parts for radio control, packet processing, and Radio Nodes (RNs) with base-band processing and radio units.

3GPP is currently working on standardization of Release 14 of the LTE concept. In FIG. 1, the LTE architecture including RAN nodes such as eNBs, Home eNBs (HeNBs), HeNB GateWay (GW) and evolved packet core nodes such as Mobility Management Entity (MME)/Serving Gateway (S-GW). FIG. 1 depicts logical interfaces such as an S1 interface connecting HeNBs/eNBs to the MME/S-GW and HeNBs to the HeNB GW, while an X2 interface is connecting peer eNBs/HENBs, optionally via an X2 GW.

Network Slicing

Network slicing is about creating logically separated partitions of the network, addressing different business purposes. These network slices are logically separated to a degree that they can be regarded and managed as networks of their own.

This is a new concept that applies to both LTE Evolution and new 5G RAT also referred to as NextGen NR System. The key driver for introducing network slicing is business expansion, i.e. improving the cellular operator's ability to serve other industries, e.g., by offering connectivity services with different network characteristics such as e.g. performance, security, and robustness.

The current working assumption is that there will be one RAN infrastructure that will connect to several Evolved Packet Core (EPC) instances, one EPC instance per network slice. As the EPC functions are being virtualized, it is assumed that the operator shall instantiate a new Core Network (CN) when a new slice should be supported. This architecture is shown in FIG. 2. Slice 0 may for example be a Mobile Broadband slice and Slice 1 may for example be a Machine Type Communication network slice.

LTE Architecture Evolution

It is not yet specified by 3GPP how the LTE architecture should evolve to meet the challenges of 5G. However, in 3GPP TR 23.799, an outline of an initial high level architecture view for 5G (NextGen) system which is shown in FIG. 3 wherein NG2 is a reference point for the control plane between NextGen (R)AN and NextGen Core.

NG3 is a reference point for the user plane between NextGen (R)AN and NextGen Core.

NG1 is a reference point for the control plane between NextGen UE and NextGen Core.

NG6 is a reference point between the NextGen Core and the data network. Data network may be an operator external public or private data network or an intra-operator data network, e.g. for provision of IMS services. This reference point corresponds to SGi, which is the reference point between the Packet Data Network Gateway (PDN GW) and the packet data network, for 3GPP accesses.

It is assumed that the above NextGen reference points will be the evolved counterparts of the LTE interfaces and that any new RAT would be integrated with the LTE radio interface at RAN level in a similar fashion as the way LTE Dual Connectivity is defined.

S1 Control Plane/NG2

S1 Control Plane interface is defined between MME and eNB, and is described in 3GPP specs TS 36.300, TS 36.410, TS 36.411, TS 36.412 and TS 36.413. The control plane stack is shown in FIG. 4. In the bottom of the control plane stack lays a Physical Layer and above a data link layer. Above the data link layer is the transport network layer which is based on Internet Protocol (IP) transport, and on top of IP, an Stream Control Transmission Protocol (SCTP) layer is added for reliable transport of signaling messages.

S1 User Plane (S1-U)/NG3

The user plane protocol stack of S1 Interface User Plane for eNB-S-GW is shown in FIG. 5. For 5G, it is assumed that NG2 will have a similar protocol stack as in S1-AP. S1 The User Plane interface is defined between S-GW and eNB, and is described in 3GPP specs TS 36.300, TS 36.410, TS 36.411, TS 36.414 and TS 29.281.

In the bottom of the user plane stack lays a Physical Layer and above a data link layer. Above the data link layer is the transport network layer is based on IP transport, and on top of IP, User Datagram Protocol (UDP) and GPRS Tunneling Protocol User Plane (GTP-U) is added for tunneling of UE eRAB individual user data. RAB stands for Radio Access Bearer while eRAN (E-RAB) stands for e-UTRAN Radio Access Bearer. GPRS means General Packet Radio Service. The GTP-U Destination Port number value for the S1-U connection is 2152. For 5G, it is assumed that for NG3 interface will have a similar protocol stack as in S1-U.

S1 User Plane/NG3 Connection Setup

For LTE, the EPS bearer service architecture from 3GPP TS 36.300 is shown in FIG. 6 between a UE and eNB in E-UTRAN, via S-GW and Packet Data Network (PDN) Gateway (P-GW) in EPC, and a Peer entity at the Internet. An EPS bearer which may comprise an E-RAB, is the level of granularity for bearer level Quality of server (QoS) control in the EPC/E-UTRAN. That is, Service Data Flows mapped to the same EPS bearer receive the same bearer level packet forwarding treatment, e.g. scheduling policy, queue management policy, rate shaping policy, RLC configuration, etc.

An E-RAB transports the packets of an EPS bearer between the UE and the EPC. When an E-RAB exists, there is a one-to-one mapping between this E-RAB and an EPS bearer. An S1 bearer transports the packets of an E-RAB between an eNodeB and a Serving GW, where a S1 bearer corresponds to a GTP-U tunnel.

For 5G, currently the following agreement has been settled according to 3GPP TR 23.799 V1.2.0.

A PDU Session is an association between the UE and a data network that provides a PDU connectivity service. The type of the association includes IP type, Ethernet type and non-IP type.

The User Plane format in NextGen on NG3 and between UP functions shall support per PDU Session tunneling, i.e. there is one tunnel per PDU Session between a pair of Network Functions (NFs) e.g. between a RAN node and a UP function in the CN and between two UP functions in the CN. All QoS classes of a session share the same outer IP header, but the encapsulation header may carry QoS markings.

The transport protocol for 5G in NG3 is not yet decided, but it can be assumed that this protocol should have similar characteristics as GTP-U.

Figure below shows the architecture difference between S1-U in LTE and NG3 in 5G.

FIG. 7 shows architectural differences between S1-U in LTE and NG3 in 5G. According to current standard and agreement within 3GPP, the source and destination transport (IP) addresses of the GTP-U tunnel will be decided first:

During setup of E-RAB in LTE

During setup of PDN session in 5G.

The difference as shown in FIG. 7 is that in LTE, within the PDN session, an S1 bearer will be established for each service data flow between RAN and CN, while in 5G, a single PDN bearer will be established for PDN session, and each service data flow will be transmitted as a QoS flow within the PDN bearer.

Currently, reconfiguration of S1-U is possible but it can only be initiated by MME used for load balancing of S-GW pool. An S-GW pool is a number of S-GW within the same CN for load sharing of S1-U connections towards RAN.

Setup and Configuration Updates/Transfer Using S1AP/S10

S1 Setup Procedure

The S1 Setup procedure, described in 3GPP 36.300, is used to exchange configured data which is required in the MME and in the eNB respectively to ensure a proper interoperation. The S1 Setup procedure is triggered by the eNB. The S1 Setup procedure is the first S1Application Protocol (AP) procedure which will be executed.

The eNB initiates the S1 Setup procedure by sending the S1 SETUP REQUEST message including supported TAs and broadcasted PLMNs to the MME.

In the successful case the MME responds with the S1 SETUP RESPONSE message which includes served PLMNs as well as a relative MME capacity indicator to achieve load balanced MMEs in the pool area.

eNB Configuration Update Procedure

The eNB Configuration Update procedure, described in 3GPP 36.300, is used to provide updated configured data in eNB. The eNB Configuration Update procedure is triggered by the eNB.

The eNB initiates the eNB Configuration Update procedure by sending the ENB CONFIGURATION UPDATE message including updated configured data like supported TAs and broadcasted PLMNs to the MME. In case one or more supported TA(s) needs to be updated, the eNB shall provide the whole list of TA(s), including those which has not been changed, in the ENB CONFIGURATION UPDATE message.

The MME responds with the ENB CONFIGURATION UPDATE ACKNOWLEDGE message to acknowledge that the provided configuration data are successfully updated.

The MME shall overwrite and store the received configuration data which are included in the ENB CONFIGURA- TION UPDATE message. Configuration data which has not been included in the ENB CONFIGURATION UPDATE message are interpreted by the MME as still valid. For the provided TA(s) the MME shall overwrite the whole list of supported TA(s).

MME Configuration Update Procedure

The MME Configuration Update procedure, described in 3GPP 36.300, is used to provide updated configured data and changes of the relative MME capacity values in the MME. The MME Configuration Update procedure is triggered by the MME.

The MME initiates the MME Configuration Update procedure by sending the MME CONFIGURATION UPDATE message including updated configured data like served PLMNs and changes of the relative MME capacity values to the eNB.

The eNB responds with the MME CONFIGURATION UPDATE ACKNOWLEDGE message to acknowledge that the provided configuration data and the relative MME capacity values are successfully updated.

The eNB shall overwrite and store the received configuration data and relative MME capacity values which are included in the MME CONFIGURATION UPDATE message. Configuration data which has not been included in the MME CONFIGURATION UPDATE message are interpreted by the eNB as still valid.

Configuration Transfer Function

Configuration transfer function, described in 3GPP TS 36.300, is a generic mechanism that allows the request and transfer of RAN configuration information (e.g. SON information) between two RAN nodes via the core network through S1AP.

The eNB Configuration Transfer procedure, is initiated by the eNB to request and/or transfer RAN configuration information via the core network, by sending the eNB CONFIGURATION TRANSFER message to the MME. The eNB CONFIGURATION TRANSFER message contains RAN configuration information (e.g. SON information) and other relevant information such as the routing address which identifies the final RAN destination node.

The MME Configuration Transfer procedure, is initiated by the MME by sending the MME CONFIGURATION TRANSFER message to the eNB. The MME CONFIGURATION TRANSFER message contains RAN configuration information (e.g. SON information) and other relevant information.

The Configuration Transfer Tunnel message between two MMEs according to 3GPP TS 29.274. is used to tunnel eNodeB Configuration Transfer messages from a source MME to a target MME over the S10 interface. The purpose of the eNodeB Direct Configuration Transfer is to transfer information from an eNodeB to another eNodeB in unacknowledged mode.

Connected Mode Mobility Functions

Once an UE has been registered to a PLMN and enters RRC/ECM connected mode, Handover, release with redirection and RRC-connection re-establishment and other mobility related procedures will occur. These procedures are described in detailed way in 3GPP TS 36.331, 3GPP TS 23.401. In connected mode, RAN selects the cell to serve the UE and is mainly based on:

Radio and load conditions of cells in different frequency layers

Optionally, RAN/eNB may consider allowed PLMNs (based on current registered PLMN and any possible Equivalent PLMNs) Forbidden/Allowed TA if information is provided when selecting cell as targets for handover or release with redirection.

UE should also be able to initiate NAS procedure, e.g. Tracking Area Update if necessary also in connected mode.

RAN/eNB receives information from different entities which is useful in connected mode mobility functions. Examples on how connected mode mobility configuration, evaluation and preparation are performed are shown in FIG. 8, FIG. 9 and FIG. 10.

See the following example actions and messages in FIG. 8 showing what information about the neighboring cells has been spread to different entities during X2 setup, X2: Initial Context Setup, RRC:SIB messages and RRC measurement configuration.

801. X2 SETUP REQUEST(Served Cells{[PCI, ECGI=[PLMN, CGI], TAC, Broadcasted PLMNs, EARFCN], . . . }.

Neighboring Cells{[PCI, ECGI=[PLMN, CGI], EARFCN, TAC], . . . }).

802. X2 SETUP RESPONSE(Served Cells{[PCI, ECGI=[PLMN, CGI], TAC, Broadcasted PLMNs, EARFCN], . . . }, Neighboring Cells{[PCI, ECGI=[PLMN, CGI], EARFCN, TAC], . . . }).

803. UE camps to cell in Source eNB, and attaches to PLMN=A.

803a. As part of 3: S1AP: Initial Context Setup Request (SPID, HO restriction list=([Serving PLMN], Equivalent PLMNs, Forbidden TAs), UE Radio Capability).

805a. RRC: SIB4 (IntraFreaBlackCellList=[PCI1, PCI2, . . . ]

805b. RRC: SIB5 (InterFreqCarrier[{EARFCN1, InterFreqBlackCellList=[PCI1, PCI2, . . . ]}, . . . ]

806. Source eNB uses info from 802,803a and 805 to create measurements.

807. RRC: RRCConnectionReconfiguration (measConfig=measId{[ . . . , carrierFreq=EARFCN, blackCellsToAddMod=[PCI1, PCI2, . . . ]]}).

808. UE measures cells with PCI and carrierFreq according to 805a, 805b, and 807.

FIG. 9 and FIG. 10 show how Handover is triggered, based on the measurement report from the UE.

See the following example actions and messages in FIG. 9 showing the case when the target cell PCI reported from the UE (see step 909) is unknown in the source eNB. I.e. in connected mode mobility evaluation and preparation: Target Cell PCI unknown in the source eNB.

In case of Target Cell PCI is unknown in the source eNB, currently in 3GPP, the source eNB can use Configuration Transfer function (see 2.1.7.4) through S1AP for TNL address discovery of the target eNB, described in 3GPP TS36.300 chapter 22.3.6.

909. RRC: MeasurementReport(measId{ . . . . PCI, . . . }, . . . ).

910. eNB selects relevant measReport uses info from 3a for HO decision.

911. HO decided, PCI unknown by eNB.

911a. RRC: MeasurementReport(measId{ . . . , PCI, ECGI=[PLMN, CGI], TAC, PLMN-IdList, . . . }, . . . ).

811b. Lookup eNB-ID from ECGI.

811c. S1AP: HANDOVER REQUIRED( . . . , Target eNB-ID=[Global eNB-ID, TAI], SourceToTargetTranspCont=[ . . . , TargetCellID=ECGI, . . . ]).

See the following example actions and messages in FIG. 10 showing the case when the target cell PCI reported from the UE (see step 1009) is known in the source eNB. I.e. Connected mode mobility evaluation and preparation when target Cell PCI known in the source eNB.

1009. RRC: MeasurementReport(measId{ . . . PCI, . . . }, . . . )

1010. eNB selects relevant measReport uses info from 3a for HO decision

1011. HO decided, PCI known by eNB, S1 HO (11a), X2 HO (11b), or Intra eNB HO (eNB internal signaling) is initiated.

1011a. S1AP: HANDOVER REQUIRED( . . . , Target eNB-ID=[Global eNB-ID, TAI], SourceToTargetTransp-Cont=[ . . . , TargetCellID=ECGI, . . . ]).

1011b. X2AP: HANDOVER REQUEST( . . . , TargetCellID=ECGI, . . . ])

When the handover decision is made, the reconfiguration on RAN in terms of handover between cells, including interaction with CN, will be executed. Examples on mobility execution is shown in FIG. 11 and FIG. 12.

FIG. 11 depicts connected mode mobility execution of intra-eNB handover with no path switch. See the following example actions and messages in FIG. 11 showing the sequence when the handover is done between two cells within the same eNB, a k a intra-eNB handover. In this case, it is assumed that the transport termination point to the eNB will not be changed.

1112. RRCConnectionReconfigurationReq(HANDOVER COMMAND).

1113. Detached from source cell, Synchronised to target cell.

1114. RRCConnectionReconfigurationComplete(HANDOVER COMPLETE).

FIG. 12 depicts connected mode mobility execution of X2 handover excluding path switch. See the following example actions and messages in FIG. 12 wherein the sequence for X2 handover is shown. In this case, it is assumed that the RAN endpoint will always be changed, and after the cell has been changed, data forwarding of DL data from Source eNB to Target eNB is necessary.

1211b. X2AP: HANDOVER REQUEST( . . . , TargetCellID=ECGI, . . . ])

1212. X2AP: HANDOVER REQUEST ACK( )

1213. RRCConnectionReconfigurationReq(HANDOVER COMMAND

1214. X2AP: STATUS TRANSFER( )

1215. Detached from source cell, Synchronised to target cell

1216. RRCConnectionReconfigurationComplete(HANDOVER COMPLETE

FIG. 13 depicts Connected mode mobility, i.e. handover, completion: X2-based handover with Serving GW relocation, related to 3GPP TS 23.401. See the following example actions and messages in FIG. 13 showing an example of the sequence diagram for mobility completion, in this case X2 based handover with serving gateway relocation.

In this case, after handover execution, the S1-U RAN endpoint will always be changed as the eNB has been changed, and the S1-U CN (Serving GW) endpoint is relocated and the RAN/CN path will be moved to the new Serving GW and the target eNB. This relocation is decided by the MME, based on network topology, i.e. the selected Serving GW serves the UE's location and for overlapping Serving GW service areas (Tracking areas), and load balancing between serving GW. For the tracking area of the target cell, this information is provided by source eNB in S1 signal PATH SWITCH REQUEST, including:

E-UTRAN CGI
CSG ID
Local Home Network ID
TAI

There is yet another example of mobility execution and completion, in case of S1 based handover. Same as in the previous case, the S1-U RAN endpoint will always be changed as the eNB has been changed, and the S1-U CN (Serving GW) endpoint is relocated and the RAN/CN path will be moved to the new Serving GW and the target eNB. According to 3GPP standard, Serving GW relocation is decided by the target MME, based on the target TAI, provided by source eNB using S1 signal HANDOVER REQUIRED, relayed through S10 with signal FORWARD RELOCATION REQUEST.

MME Triggered Serving GW Relocation

MME triggered Serving GW relocation is described in 3GPP TS 23.401, chapter 5.10.4. This procedure allows the MME to trigger Serving GW relocation due to events other than mobility scenarios. Such scenario exists during the establishment of a SIPTO at local network PDN connection with stand-alone GW or during the establishment of a SIPTO above RAN PDN connection.

FIG. 14 depicts MME triggered Serving GW relocation. See the following example actions and messages of this case in FIG. 14 wherein it is assumed that the S1-U RAN endpoint will be the same before and after GW relocation.

1401. MME determines that the serving GW relocation needs to be performed.

1402. Create Session Request.

1403a Modify Bearer Request.

1403b. Modify Bearer Response.

1404. Create Session Response.

1405. Bearer Modify Request/Response.

1406a. Delete Session Request.

1406b. Delete Session Response.

SUMMARY

It is an object of embodiments herein to provide an improved radio communications network.

According to a first aspect of embodiments herein, the object is achieved by a method performed by a network node for controlling whether or not to change a transport path for a user plane session in a radio communications network. The path prolongs along a first part between an antenna endpoint of a network node and a Packet Processing Function, PPF, instance serving the network node and a second part between the PPF instance and a Core Network, CN, endpoint.

The network node identifies available CN endpoints in a CN, available PPF instances in a Radio Access Network, RAN, and of available antenna endpoints in the RAN. The available CN endpoints, available PPF instances and available antenna endpoints are available for the user plane session and comprises a number of possible transport paths for the user plane session.

The network node obtains characteristics of available first parts of the possible transport paths, and characteristics of available second parts of the possible transport paths.

When the network node detects a change event related to the user plane session, the network node controls whether or not to change the transport path to any of the a number of possible transport paths for the user plane session based on the obtained characteristics of available first parts of the transport path, and characteristics of available second parts of the transport path.

According to a second aspect of embodiments herein, the object is achieved by a network node for controlling whether or not to change a transport path for a user plane session in a radio communications network. The path is adapted to prolong along a first part between an antenna endpoint of a network node and a Packet Processing Function, PPF, instance serving the network node 111 and a second part between the PPF instance and a Core Network, CN, endpoint. The network node is configured to:

- Identify available CN endpoints in a CN, available PPF instances in a Radio Access Network, RAN, and of available antenna endpoints in the RAN. The available CN endpoints, available PPF instances and available antenna endpoints are adapted to be available for the user plane session and comprise a number of possible transport paths for the user plane session.
- Obtain characteristics of available first parts of the possible transport paths, and characteristics of available second parts of the possible transport paths.
- When detecting a change event related to the user plane session, control whether or not to change the transport path to any of the a number of possible transport paths for the user plane session based on the obtained characteristics of available first parts of the transport path, and characteristics of available second parts of the transport path.

An advantage of embodiments herein is that the load of S-GW pools can be balanced.

A further advantage of embodiments herein is that the fulfillment of the QoS end-to-end (e2e) performance can also be optimized dynamically on a UE with mobility, based on the characteristics of the available RAN/CN transport endpoint pairs and RAN internal characteristics.

A further advantage of embodiments herein is that the fulfillment of the QoS within the mobile NW domain can be optimized based on the characteristics of the available RAN/CN transport endpoint pairs and RAN internal characteristics.

A further advantage of embodiments herein is that the load of RAN endpoints and transport links can be balanced, it also enables possibility to maximize the number of data streams between RAN and CN while fulfilling the characteristics requirement of the streams.

BRIEF DESCRIPTION OF THE DRAWINGS

Examples of embodiments herein are described in more detail with reference to attached drawings in which.

DETAILED DESCRIPTION

As part of developing embodiments herein a problem will first be identified and discussed.

As mentioned above, according to current 3GPP standard, changes of RAN endpoint is possible and mandatory only in the following occasions:
Change of eNB instance during handover.
CN endpoint is possible only in the following occasions:
Change of eNB instance during handover,
Change of TAI in connection to handover, which forces to a Serving GW relocation.
Triggered by MME.

The decision of reselecting CN endpoint such as S-GW, is based on the Tracking Area Identity (TAI) the cell is serving and/or the load of the S-GW in case multiple S-GW can be used for re-selection.

However, in e.g. a split RAN architecture, a eNB may be served by a pool of Packet Processing Functions (PPF) instances, spread over a wide geographic area. These PPF instances may be implemented as Virtual Network Function (VNF) or physically. Each PPF instance, also referred to as data processing instance, has capacity to serve a number of user sessions, and will have its own RAN endpoint. This pool of PPF instances may also serve multiple eNBs. This new architecture will cause multiple endpoints in RAN and CN.

Figure 15:
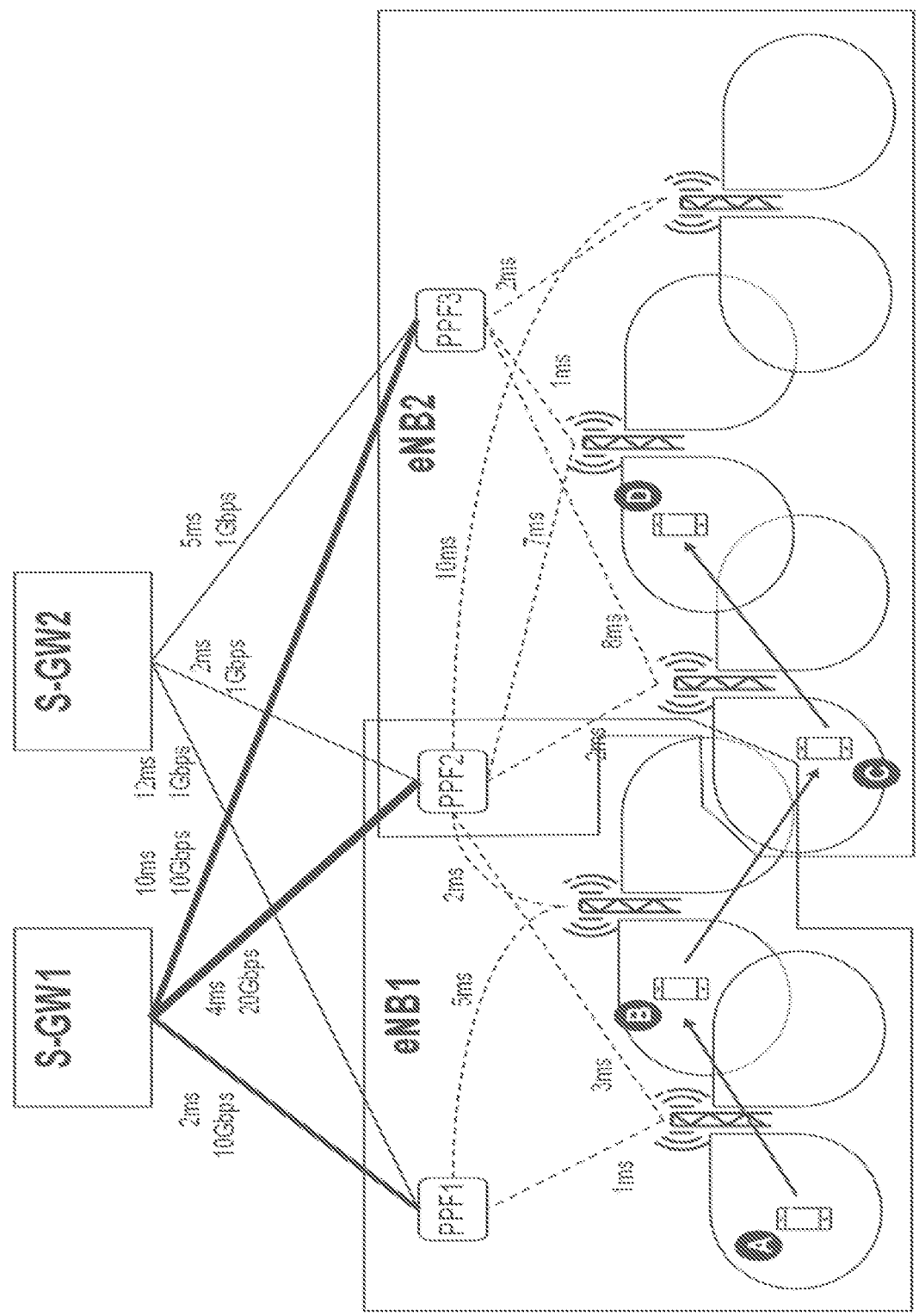
FIG. 15 is a schematic block diagram depicting embodiments of a network.

An example of multiple endpoints in both RAN and CN is illustrated in FIG. 15, On the CN side, S-GW1 and S-GW2 may serve a certain geographic area and are located in different locations. On RAN side, a pool of data PPF instances PPF1, PPF2 and PPF3 are serving eNBs in the same area, where PPF1 and PPF2 serve eNB1, while PPF2 and PPF3 serve eNB2. eNB1 and eNB2 will serve their respective areas and/or frequencies.

For each link between (1) an eNB antenna endpoint—RAN endpoint such as a PPF instance, and (2) a RAN endpoint such as a PPF instance—CN endpoint will have its own characteristics in terms of e.g. latency, and in case of RAN-CN endpoint pairs, also max bitrate.

FIG. 15 depicts an example on multi endpoint on both CN and RAN.

As the figure shows, a user data path between a UE and a CN, when the UE is in different locations, can be connected through several antenna endpoint-PPF instance-CN endpoint combinations, resulting different characteristics. The table below shows the best antenna-RAN-CN-endpoint combinations.

TABLE 1

Antenna-RAN-CN endpoints combination for best characteristics

| UE LOCATION | LOWEST LATENCY | HIGHEST BANDWIDTH |
|---|---|---|
| A | PPF1 - S-GW1 | PPF2 - S-GW1 |
| B | PPF2 - S-GW2 | PPF2 - S-GW1 |
| C | PPF2 - S-GW2 | PPF2 - S-GW1 |
| D | PPF3 - S-GW2 | PPF2 - S-GW1 |

This table shows that in case for best latency characteristics, a path switch should be done on each location change except during handover between eNB1 and eNB2 (A to B, and C to D), while for best bandwidth, no path switch shall be done during any location change, which is not in line with the current standard.

Change of endpoint pairs during intra eNB handover (A to B and C to D)

No change of endpoint during X2/S1 handover (B to C)

So as a consequence of the problem is that the decision of path switch of a user data path is highly depending on what characteristics is needed for the user data (in the example above is lowest latency versus highest bandwidth), mobility of the user and change of characteristics on CN endpoints, PPF instances, antenna endpoints and the paths in between them.

Embodiments herein refer to an S1 user plane selection in case of a change event related to the user plane session such as e.g. a handover, and some embodiments herein may be implemented as a Traffic Handling Function.

In order to select the optimum path between the transport endpoints between the CN and the RAN e.g. in connection to cell change, the following actions may be taken:

1) Definition of characteristics between the cell/antenna endpoint and the data processing instances, also referred to as the PPF instances, and for the PPF instances and the CN endpoints used for controlling the RAN/CN endpoint pair selection decision.

2) Mechanism for RAN to distribute the characteristics between the antenna endpoint and the PPF instance and the characteristics between the PPF instances and the CN endpoint for RAN/CN endpoint pair selection decision.

3) Mechanism for RAN to control e.g. by requesting and deciding whether to change or not change a transport path such as endpoint pairs for a user plane session (in any combinations) in connection to any type change event related to the ongoing user plane session. Which change event may be related to cell changes e.g. intra-eNB handover, inter-eNB X2 handover and inter-eNB S1 handover or anytime due to e.g. load balancing of RAN endpoints and/or MME decided S-GW relocation.

Observe that although LTE terminology is used herein, embodiments herein may also be used for 5G. Also type of cell changes is not only limited to handover, but also including e.g. carrier aggregation or dual connectivity cases.

Observe that different methods are described such as "distribution during association between nodes" and "distribution during on demand occasion".

It should be noted that the term "endpoint" when used herein means "transport endpoint" and the wordings "endpoint" and "transport endpoint" may be used interchangeably.

The overall principles of embodiments herein would work for both an LTE-like architecture and a new architecture based on an evolution of the S1 interface.

Figure 16:
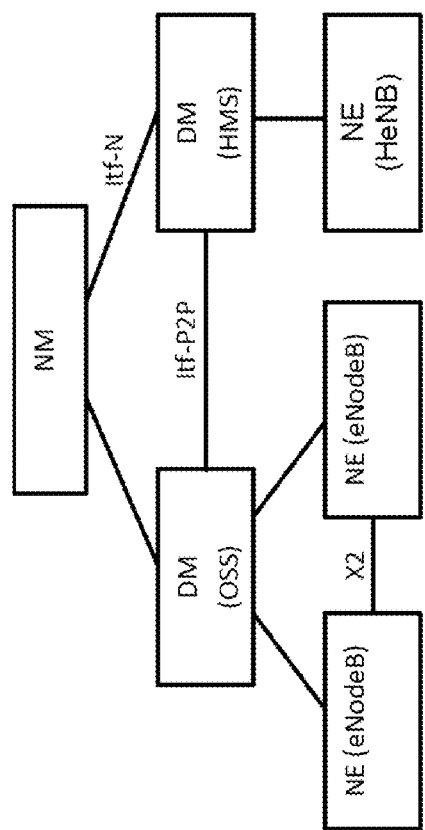
FIG. 16 is a schematic block diagram illustrating a prior art.

A management system wherein some embodiments herein may be implemented is shown in FIG. 16. The Node Elements (NE), also referred to as eNodeB, are managed by a Domain Manager (DM), also referred to as the operation and support system (OSS). A DM may further be managed by a Network Manager (NM). Two NEs are interfaced by X2, whereas the interface between two DMs is referred to as Interface (Itf)-Peer to Peer (P2P). The management system may configure the NEs, as well as receive observations associated to features in the network elements. For example, DM observes and configures NEs, while NM observes and configures DM, as well as NE via DM.

By means of configuration via the DM, NM and related interfaces, functions over the X2 and S1 interfaces may be carried out in a coordinated way throughout the RAN, eventually involving the Core Network, i.e. MME and S-GWs.

Figure 17:
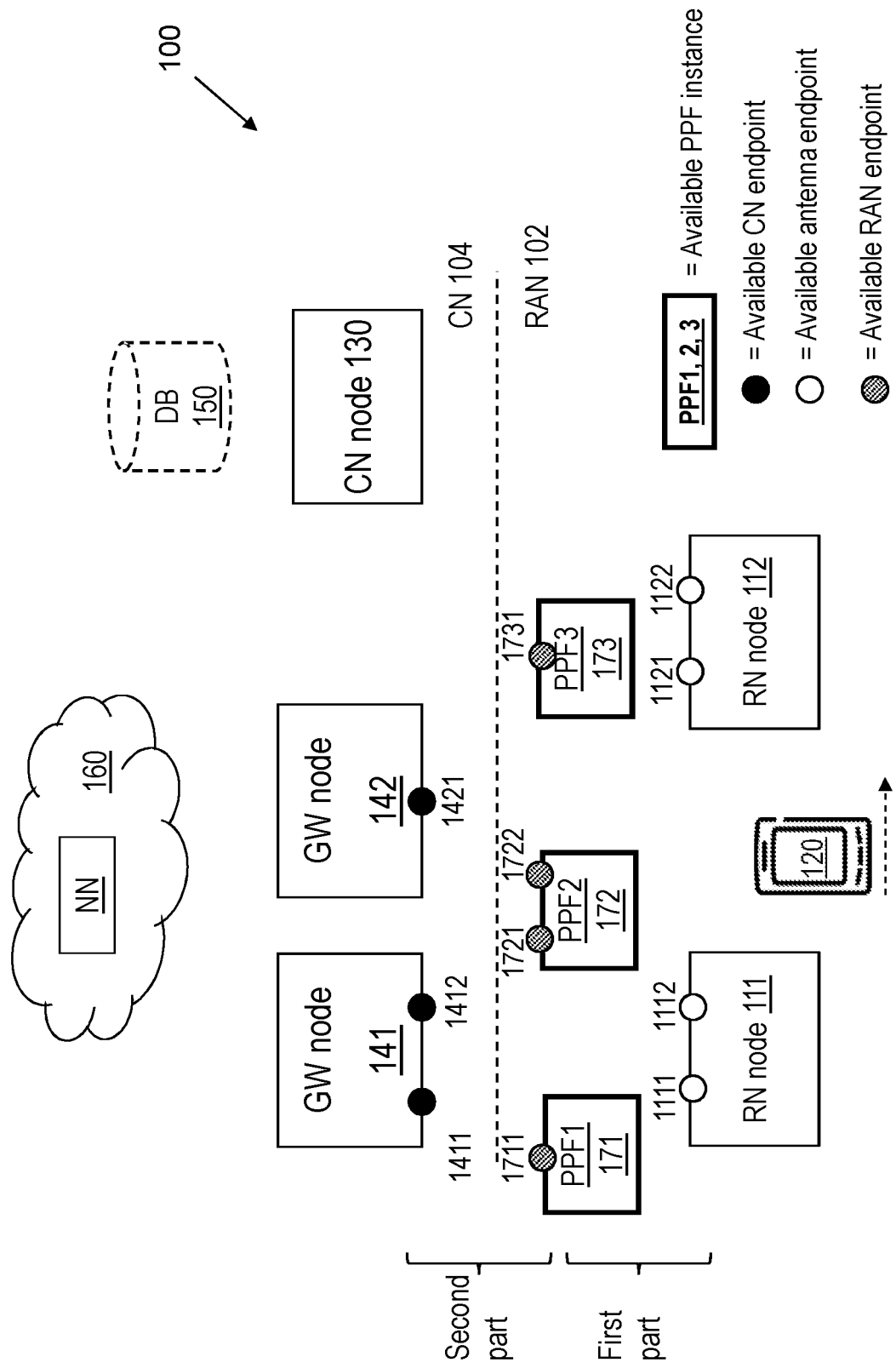
FIG. 17 is a schematic block diagram depicting embodiments of a network.

Embodiments herein relate to radio communications networks in general. A radio communications network 100 as schematically illustrated in FIG. 17. For example, embodiments herein may be implemented in the radio communications network 100. The radio communications network 100 may be a cellular communications network. Further, the radio communications network 100 may be an LTE network, a 5G network, a WCDMA network, an GSM network, any 3GPP cellular network, Wimax, or any other radio communications network or system.

The wireless communication network 100 comprises one or more RANs, e.g. a RAN 102, and one or more CNs, e.g. a CN 104. The wireless communication network 100 may use a number of different technologies, such as Wi-Fi, LTE, LTE-Advanced, 5G, WCDMA, Global System for Mobile communications/enhanced Data rate for GSM Evolution (GSM/EDGE), WiMax, or UMB, just to mention a few possible implementations. Embodiments herein relate to recent technology trends that are of particular interest in a 5G context, however, embodiments are also applicable in further development of the existing wireless communication systems such as e.g. WCDMA and LTE.

RAN nodes such as at least a radio network node 111, also referred to as any of the source radio network node 111 and the target radio network node 111 in some scenarios, and a radio network node 112, also referred to as the second radio network node 112, the source radio network node 112 or the target network node 112 in some scenarios, operate in the RAN 102 in the radio communications network 100. The one or more RAN nodes such as the Radio network node 111 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 111 depending e.g. on the first radio access technology and terminology used. The radio network node 111 and the radio network node 112 may be referred to as a serving radio network nodes and communicate with a wireless device 120 with Downlink (DL) transmissions to a wireless device 120 and Uplink (UL) transmissions from the wireless device 120. Other examples of the radio network node 111 and the radio network node 112 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

The one or more RAN nodes such as the radio network node 111 and the radio network node 112 each provides radio coverage via one or more antenna endpoints over a geographical area, which may also be referred to as a cell, a cluster, a beam or a beam group, of a Radio Access Technology (RAT), such as 5G, LTE, Wi-Fi or similar.

The radio network node 111 comprises two available antenna endpoints 1111, 1112 also referred to as eNB antenna points and RAN transport endpoints.

The radio network node 112 comprises two available antenna endpoints 1211, 1122 also referred to as RAN transport endpoints.

An antenna endpoint is a point where antenna data and/or cell data for all the users associated to the antenna/cell is being processed. Note that the antenna endpoint may also be referred to as a cell endpoint.

However, it should be noted that more than two radio network nodes (not shown) may operate in the RAN 102 according to some embodiments. Further, the radio network nodes 111, 112 may each comprise more or less than two RAN transport endpoints.

Each radio network node 111, 112 is served by one or more PPF instances PPF1 171, PPF2 172, PPF3 173. The radio network node 111 is served by PPF instance PPF1 171 and PPF2 172.

The radio network node 112 is served by PPF instance PPF2 172 and PPF3 173.

For each PPF instance, there will be one or several RAN endpoints. In this example PPF1 171 contains RAN endpoint 1711, PPF2 172 contains RAN endpoints 1721 and 1722, and PPF3 173 contains RAN endpoints 1731. Observe that same RAN endpoint may be used by several Radio network nodes, e.g. in this example RAN endpoints 1721 and 1722 may be used by both Radio network nodes 111 and 112.

At least one CN node 130 may be configured to operating and/or comprised in the CN 104.

The at least one CN node 130 may e.g. be a Mobility Management Entity (MME) such as MME1 and MME2, or any other core network node. In some embodiments, the one or more CN node 130 interface towards the PPF instances PPF1, PPF2, PPF2.

Gateway nodes such as a first gateway (GW) node 141 and a second GW node 142 may be operating and/or comprised in the CN 104. The first GW node 141 and the second GW node 142 are configured to operate in the radio communications network 100, e.g. in the CN 104 and communicate with the CN node 130.

The first GW node 141 and second GW node 142 may e.g. be a serving gateway node (S-GW) in an LTE network or a user plane GW node in 5G network. The first GW node 141 comprises two available CN transport endpoints, referred to as CN endpoints 1411, 1412 herein. The second GW node 142 comprises one available CN transport endpoint referred to as CN endpoint 1421. Thus in FIG. 17, the CN 104 comprises three CN endpoints 1411, 1412, 142. However, it should be noted that the CN 104 may comprise more than three CN endpoints and more than two GW nodes.

In the wireless communication network 100, wireless devices e.g. a wireless device 120 such as a mobile station, a non-Access Point (non-AP) STA, a STA, a user equipment and/or a wireless terminals, communicate via one or more RANs such as the RAN 102, to one or more CNs such as the CN 104. Thus, the wireless device 120 is operating in the radio communications network 100.

It should be understood by the skilled in the art that "wireless device" is a non-limiting term which means any terminal, communications device, wireless communication terminal, user equipment, Machine-Type Communication (MTC) device, Device-to-Device (D2D) terminal, or node e.g. smart phone, laptop, mobile phone, sensor, relay, mobile tablets, an Internet-of-Things (IoT) device, e.g. a Cellular IoT (CIoT) device or even a small base station communicating within a service area.

In this disclosure the terms communications device, terminal, wireless device and UE are used interchangeably. Please note the term user equipment used in this document also covers other wireless devices such as Machine-to-Machine (M2M) devices, even though they do not have any user.

The wireless communication network 100 may further comprise a database 150. Identifiers of available CN endpoints 1411, 1412, 1421, RAN endpoints 1711, 1721, 1722, 1731, and antenna endpoints 1111, 1112, 1121, 1122 may be stored in the database 150. The database 150 may be accessible both from RAN nodes such as any of the radio network node 111 and the radio network node 112, from CN nodes such as the core network node 130, and the GW nodes 141 and 142.

Some actions in methods herein may performed by any of the radio network node 111, the second radio network node 112 core network node 130, these are therefore in a general term referred to as the network node 111, 112, 130. As an alternative, any distributed Network Node (NN) and functionality, e.g. comprised in a cloud 160 may be used for performing these actions.

According to an example scenario in some embodiments herein, the following may be comprised:

A RAN node such as the radio network node 111 and the radio network node 112 may comprise multiple antenna endpoints 1111, 1112, 1121, 1122.

A RAN node such as the radio network node 111 and the radio network node 112 may be served by one or more PPF instances PPF1 171, PPF2 172, PPF3 173 with RAN endpoints 1711, 1721, 1722, 1731.

A CN such as the CN 104 may comprise one or multiple transport endpoints such as CN endpoints 1411, 1412, and 1421.

Embodiments herein relate to methods performed by the radio network node 111 for controlling whether or not to change a transport path for a user plane session in a radio communications network 100. The user plane session may be used by the wireless device 120 to for transmitting data within the radio communications network 100.

The path of a user plane session prolongs along: A first part between an antenna endpoint of a network node 111 and the Packet Processing Function, PPF1 and PPF2, with its RAN endpoint 1711, 1721, 1722, instance 1111, 1112 serving the network node 111 and a second part between the PPF instance PPF1, PPF2, with RAN endpoint 1711, 1721, 1722 and a Core Network, CN, endpoint 1411, 1412, 1421.

The available CN endpoints 1411, 1412, 1421, available PPF instances 171, 172, 173 with RAN endpoints 1711, 1721, 1722, 1731 and available antenna endpoints 1111, 1112, 1121, 1122 are available for the user plane session and comprises a number of possible transport paths for the user plane session.

Between each available CN endpoints 1411, 1412, 1421, and available antenna endpoints 1111, 1112, 1121, 1122, via the available PPF instances 171, 172 with RAN endpoints 1711, 1721, 1722, 1731, also referred to as path, there is a channel with certain characteristics, such as e.g. delay and total Bandwidth (BW).

E.g. a UE such as the wireless device 120 requires a session to be set up for incoming data communication or outgoing data communication. Therefore, a number of data streams needs to be established between the RAN 102 and the CN 104 to be used for the required session, with certain characteristics requirements such as e.g. max delay and bandwidth.

For each data stream, one RAN—CN transport endpoint pair via an antenna instance, =path, is selected in order to fulfill the data stream characteristics requirement, and maximize the number of data streams between the RAN 102 and the CN 104 fulfilling the characteristics requirement of the streams.

Figure 18:
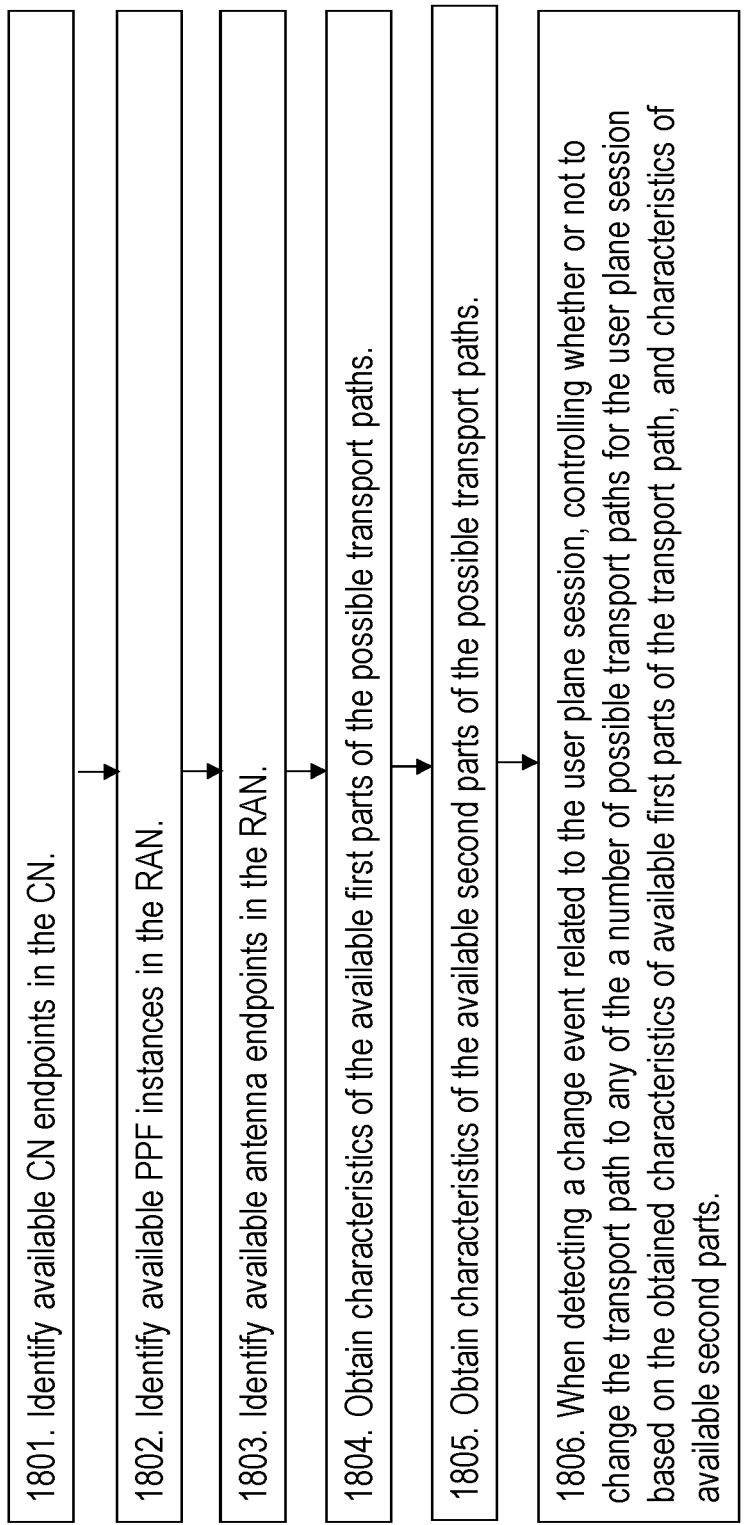
FIG. 18 is a sequence diagram illustrating embodiments of a method.

Example embodiments of a method performed by the network node 111, 112, 130 such as any of the radio network node 111, the second radio network node 112 e.g. a target eNB, or the CN node 130, for controlling whether or not to change a transport path for a user plane session in the radio communications network 100 will now be described with reference to a flowchart depicted in FIG. 18. The method will first be described in a view seen from the core network node 130 together with FIG. 18, followed more detailed explanations and examples.

In case of a handover event, the radio network node performing the method may be any one of a target radio network node and a source radio network node.

As mentioned above, the path prolongs along: A first part between an antenna endpoint of a network node 111 and a PPF, instance 1111, 1112 serving the network node 111 and a second part between the PPF instance and a Core Network, CN, endpoint.

The method comprises the following actions, which actions may be taken in any suitable order.

To be able to control such as obtain a suitable transport path for the user plane session according to embodiments herein, available antenna endpoints and PPFs at the RAN 102 and CN endpoints at the CN 104 shall first be identified. It is preferred that the CN 104 and the RAN 102 are aware of which transport endpoints and antenna instances that are available on the remote side for a user plane interface, also known as S1-U for LTE and NG3 for 5G, in order to have a possibility to select a transport path with the best characteristics for an upcoming user plane session.

Thus, the network node 111, 112, 130 identifies available CN endpoints 1411, 1412, 1421 in the CN 104, available PPF instances PPF1, PPF2, PPF3 also referred to as PPF1 171, PPF2 172, PPF3 173, which may comprise RAN endpoints 1711, 1721, 1722, 1731 in the RAN 102, and of available antenna endpoints 1111, 1112, 1121, 1122 in the RAN 102.

The available CN endpoints 1411, 1412, 1421, available PPF instances 171, 172,173 e.g. with RAN endpoints 1711, 1721, 1722, 1731 and available antenna endpoints 1111, 1112, 1121, 1122 are available for the user plane session and comprises a number of possible transport paths for the user plane session.

Action 1801

Thus, the network node 111, 112, 130 identifies, available CN endpoints 1411, 1412, 1421 in the CN 104. According to the example shown in FIG. 17, the CN 104 comprises three CN endpoints 1411, 1412, 1421. In this example the core network node 130 may obtain three identifiers of available CN endpoints 1411, 1412, 1421 which may be transferred to the network node 111, 112, 130 enabling the network node 111, 112, 130 to identify the available CN endpoints 1411, 1412, 1421 in the CN 104. Examples of type of identifiers may e.g. be a transport layer address according to 3GPP 36.413, an IP address for the endpoint, a new identifier created for this purpose.

Action 1802

The network node 111, 112, 130 further identifies available PPF instances PPF1 171, PPF2 172 and PPF3 173 e.g. with their RAN endpoints 1711, 1721, 1722, 1731 in the RAN 102. According to the example shown in FIG. 17, the RAN 104 comprises three PPF instances PPF1, PPF2 and PPF3. In this example the radio network node 111 may identify the three PPF instances PPF1, PPF2 and PPF3 and their RAN endpoints by e.g. a transport layer address according to 3GPP 36.413, an IP address for the endpoint, a new identifier created for this purpose.

Action 1803

The network node 111, 112, 130 further identifies available antenna endpoints 1111, 1112, 1121, 1122 in the RAN 102. According to the example shown in FIG. 17, the radio network node 111 comprises two available antenna endpoints 1111, 1112, and the radio network node 112 comprises two available antenna endpoints 1121, 1122. This means the RAN 102 comprises four available antenna endpoints 1111, 1112, 1121, 1122. In this example the network node 111 may identify the available antenna endpoints 1111, 1112, 1121, 1122 by e.g. E-UTRAN Cell Global Identity (E-CGI), internal IP address connected to the E-CGI, or new identifier identifying the antenna point/cell.

To be able to select such as control a suitable transport path for the user plane session according to embodiments herein, characteristics of the first part and the second part of available transport paths will be obtained and e.g. be investigated and compared with a current transport path of the user plane session.

Action 1804

Thus the radio network node 111 obtains characteristics of the available first parts of the possible transport paths.

Action 1805

The radio network node 111 further obtains characteristics of the available second parts of the possible transport paths.

In some embodiments, the characteristics of the available first parts of the transport path, and the characteristics of the available second parts of the transport path are obtained in advance of any change event related to the user plane session.

In some alternative embodiments, the characteristics of the available first parts of the transport path, and the characteristics of the available second parts of the transport path are obtained during the detected change event related to the user plane session.

The characteristics of any one or more out of: the available first parts of the transport path and the available second parts of the transport may relate to any one or more out of: latency of said first part and/or second part, obtainable bandwidth of said first part and/or second part, number of active sessions in said first part and/or second part, bandwidth usage of said first part and/or second part, monetary transmission cost of said first part and/or second part, and any variables which provides preference of said first part and/or second part.

In some alternative embodiments, the characteristics of the available first parts of the possible transport paths, and characteristics of the available second parts of the possible transport paths, are obtained in any one out of:

A static configuration, wherein the characteristics are stored in a data base 150 when a new available CN endpoint, a new available PPF instance PPF1, PPF2, PPF3 with their RAN endpoints and/or a new available antenna endpoint is introduced, and an autonomous configuration, wherein the characteristics are obtained by (a) obtaining measurements of the respective available first part and second part of the number of possible transport paths, b) matching identities related to the characteristics of the respective available CN endpoints 1411, 1412, 1421, available PPF instances PPF1, PPF2, PPF3 and/or available antenna endpoints 1111, 1112, 1121, 1122.

In the static configuration, the characteristics may be stored in the data base 150 when a new available CN endpoint 1411, 1412, 1421, a new available PPF instance PPF1, PPF2, PPF3 with their RAN endpoints, and/or antenna instance 1111, 1112, 1121, 1122 is introduced.

In the autonomous configuration, the characteristics may be obtained by (a) obtaining measurements of the respective transport path of the number of possible paths, and/or (b) matching identities related to the characteristics of the respective available first and second part of the path.

The obtaining of the characteristics according to the static configuration and the autonomous configuration will be described more in detail below.

Action 1806

When detecting a change event related to the user plane session, the radio network node 111 or e.g. CN node 130 controls whether or not to change the transport path to any of the a number of possible transport paths for the user plane session based on the obtained characteristics of available first parts of the transport path, and characteristics of available second parts of the transport path. The obtained characteristics of the first part and the second part of the available transport paths are e.g. investigated and compared with the current ongoing transport path of the user plane session and/or retrieved configuration of the transport paths. In this way the radio network node 111 and/or the CN node 130 can control that the most suitable transport path for the user plane session is selected for example in occasion of an event such as a hand over scenario from the network node 111 to the second network node 112.

Controlling when used here means controlling the path selection during handover or path switch procedure.

In some embodiments, the characteristics of the available first parts of the transport path, and the characteristics of the available second parts of the transport relate to latency. In these embodiments, the radio network node 111 and/or CN node 130 may control whether or not to change the transport path to any of the a number of possible transport paths for the user plane session based on selecting the transport path with lowest delay.

In some embodiments, the characteristics of the available first parts of the transport path, and the characteristics of the available second parts of the transport relate to bandwidth. In these embodiments the radio network node 111 and/or CN node 130 may control whether or not to change the transport path to any of the a number of possible transport paths for the user plane session based on selecting the transport path with broadest bandwidth.

In some embodiments, the characteristics of the available first parts of the transport path, and characteristics of the available second parts of the transport relate to latency and bandwidth. In these embodiments the radio network node 111 and/or CN node 130 may control whether or not to change the transport path to any of the a number of possible transport paths for the user plane session based on selecting a transport path with lowest delay and broadest bandwidth.

The detected change event related to the user plane session may comprise any one or more out of: A handover decision, adding a carrier related to carrier aggregation and setting up or changing a dual connectivity, a change of PPF instance PPF1, PPF2, PPF3 initiated by the radio network node 111 due to changes of characteristics, a change of PPF instance PPF1, PPF2, PPF3 initiated by a core network node 130, such as e.g. an MME, due to changes of characteristics. Those changes of characteristics may be caused by e.g. load balancing of PPF pool, error in PPF/S1-U, change of load on some users in the system etc.

Embodiments herein will now be further described and exemplified. The text below is applicable to and may be combined with any suitable embodiment described above. It should be noted that in the examples below the radio network node 111 is referred to as the eNB or the source eNB, the second radio network node 112 is referred to as the neighboring eNB or target eNB, the wireless device 120 is referred to as the UE, and the CN node 130 is referred to as the MME or MME1 in the examples below.

Embodiments herein may comprise:

1) A definition of characteristics between an available antenna endpoint and an available PPF instance.

2) A characteristics distribution method to the related RAN and CN nodes, and mechanism for controlling endpoint pair changes such as path changes of the transport path to any of the a number of possible transport paths for the user plane session, e.g. during cell changes and/or other occasions according to an alternative comprising characteristics distribution prior change of endpoint pairs.

a. Characteristics distribution during radio network node setup 111, 112 such as eNB setup, centralized approach.

b. Characteristics distribution during association between nodes, distributed approach.

c. Change of endpoint pairs occasions, examples.

3) Characteristics distribution method to the related RAN and CN nodes, and mechanism for controlling endpoint pair changes such as path changes of the transport path to any of the a number of possible transport paths for the user plane session, e.g. during cell changes and/or other occasions according to an alternative comprising characteristics distribution during demanding occasion.

a. Characteristics distribution principle.

b. Change of endpoint pairs occasions (including characteristics distribution), examples 1) Definition of Characteristics Between an Antenna Endpoint and a PPF Instance Characteristics between an available antenna endpoint and an available PPF instance may comprise of the following parts:

Identification of the available antenna endpoints 1111, 1112, 1121, 1122.

Identification of the available PPF instances PPF1, PPF2, PPF3 with their RAN endpoints 1711, 1721, 1722, 1731.

Characteristics information between the available antenna endpoints 1111, 1112, 1121, 1122 and the available PPF instances PPF1, PPF2, PPF3. I.e. the characteristics of the second parts of the available transport paths.

For identifying an available antenna endpoint 1111, 1112, 1121, 1122, in case of LTE, an E-UTRAN Cell Global ID (ECGI) may be used. For 5G, as there may be multiple antenna endpoints per System Area, ECGI may be replaced by e.g. an identity for identifying a unique antenna endpoint and/or System Area in a certain radio network node 111 such as when being a gNB.

For identifying an available PPF instance PPF1, PPF2, PPF3 and their corresponding RAN endpoints, a transport layer address Information Element (IE) in S1AP, or other new identity may be used.

Characteristics information between the available antenna endpoints 1111, 1112, 1121, 1122 and the available PPF instances PPF1, PPF2, PPF3 with their corresponding RAN endpoints may be any combinations of the following example attributes: latency of said first part and/or second part, obtainable bandwidth of said first part and/or second part, number of active sessions in said first part and/or second part, bandwidth usage of said first part and/or second part, monetary transmission cost of said first part and/or second part, and any variables which provides preference of said first part and/or second part. E.g. any combination of latency between antenna endpoint and PPF instance, obtainable bandwidth between antenna endpoint and PPF instance, number of active users and/or sessions between antenna endpoint and PPF instance, bandwidth usage between antenna endpoint and PPF instance, transmission cost (monetary) between antenna endpoint and PPF instance and other variables which provides preference between antenna endpoint and PPF instance.

Examples on the format of the characteristics may be: Triplet: ECGI-RAN endpoint ID—transmission cost, and/or ECGI—priority list of RAN endpoint ID.

2) Characteristics Distribution Method to the Related RAN and CN Nodes, and Mechanism for Controlling Endpoint Pair Changes During Cell Changes and/or Other Occasions—Characteristics Distribution Prior Change of Endpoint Pairs Obtaining Characteristics This part is related to Action 1804 and 1805 described above.

Examples of Static Configuration

When a new available antenna endpoints 1111, 1112, 1121, 1122, PPF instance or CN endpoint 1411, 1412, 1421 is introduced, the characteristics value, e.g. "path delay" and "path bandwidth" between the new available antenna endpoints 1111, 1112, 1121, 1122, PPF instance or CN endpoint 1411, 1412, 1421, and the existing remote endpoints may be set manually, and these values may be stored in the database 150 or in the core network node 130 such as the MME, and eventually in the radio network node 111 for the path selection and/or decision action.

The distribution of this static configuration may be performed through the RAN↔CN control interface e.g. in LTE, during a eNB/MME configuration update procedure in S1AP, or outbound through e.g. O&M interface.

Examples of Autonomous Determination

In autonomous determination, the characteristics of the endpoint pairs may be determined and/or obtained by the Radio network node 111 and/or CN node such as the gateway nodes 141, 142 e.g. by measurements and/or Identity matching.

Obtaining the characteristics by measurements, may be performed by like Round Trip Time (RTT) measurement by using IP ping or other test tools, and for bandwidth measurement by e.g. continuously or periodically running a Two-way Active Measurement Protocol (TWAMP) tests.

Obtaining the characteristics by identity matching, e.g. each data center has assigned with a unique identifier or an Area Identifier (AreaId). A data center here refers to a facility in a physical location composed of networked computers and storage that businesses or other organizations use to organize, process, store and disseminate large amounts of data. When each available RAN endpoint 1711, 1721, 1722, 1731, or CN endpoint 1411, 1412, 1421 is created in a data center, a data center identifier is known by the available RAN endpoint 1711, 1721, 1722, 1731, or CN endpoint 1411, 1412, 1421 in the Radio network node 111 and/or gateway node 141, 142. An endpoint pair with the same data center identifier is recognized having shorter delay than pair with different data center identifiers. In case of using measurement, the results may be stored in the database 150 or in the core network node 130 such as in the MME, and eventually in the Radio network node 111 for the endpoint pair selection Action.

The distribution of the determination results may be performed with the following example methods:

(a) Continuously through the RAN↔CN control interface e.g. in LTE eNB/MME configuration update procedure in S1AP may be used.

(b) Continuously through outbound such as O&M interface, (c) During runtime when the RAN↔CN user plane needs to be setup through RAN↔CN control signaling, e.g. in LTE during E-RAB setup, E-RAB modify, Initial context setup, and/or handover request procedure in S1AP.

Characteristics Distribution During Radio Network Node Setup Such as eNB Setup, in a Centralized Approach.

In this approach, the characteristics of the first part and second part of the available transport paths will be stored in a centralized node, e.g. in the Data Base (DB) 150. The DB 150 may be accessible both from RAN nodes such as the network node 111 and from CN nodes such as the CN node 130. The centralized DB 150 may be collocated with other nodes, and may also be distributed for scalability and redundancy reasons.

Each time when the following configuration in an eNB such as the network node 111 is changed, the corresponding characteristics shall be registered to the centralized DB 150. I.e. the RAN/CN nodes registers the new endpoint in the DB for later discovery.

Add/remove of an antenna endpoint

Add/remove of a PPF instance

Add/removal of a path between an antenna endpoint and a PPF instance.

Changes of characteristics in an antenna endpoint and/or a PPF instance.

In LTE, the changes may be informed to the CN 104 through an MME such as the CN 130 by a new IE in S1 Setup procedure and/or eNB configuration update procedure and that the MME updates the DB 150. Another alternative is that the DB 150 is updated using other channels, e.g. using Operation and Maintenance (O&M).

Characteristics Distribution During Association Between Nodes, in a Distributed Approach.

In this approach, only necessary characteristics needed for the radio node 111 and the CN node 130 will be stored locally such as in an LTE eNB and MME. The first distribution of information between the radio node 111 and the CN node 130 is done during a first association, changes of association between these nodes or changes on characteristics of the radio node 111 the PPF instances and the CN node 130. Examples may be setup of S1/X2 interfaces, detection of neighboring cell relationship etc. The distribution of characteristics may be done through the following interfaces and procedures.

S1AP: S1 Setup Procedure
S1AP: eNB Configuration Update
X2AP: X2 Setup Procedure
X2AP: eNB Configuration Update
S1AP: eNB Configuration Transfer
S1AP: MME Configuration Transfer
S10: Configuration Transfer Tunnel The basic principle for the distribution may e.g. be as follows:

When a eNB such as the network node 111 is connected to an MME such as the CN node 130, the eNB should transfer the available characteristics for the eNB, i.e. its own and it neighbor eNB's antenna endpoints and PPF instances through S1AP: S1 Setup Procedure.

When the eNB detects a new cell which is unknown for the eNB, the eNB and the new neighbor eNB such as the second radio network node 112 serving the new cell may exchange their characteristics through S1AP: eNB Configuration Transfer, S1AP: MME Configuration Transfer and in some cases also S10: Configuration Transfer Tunnel.

When the eNB sets up an X2 connection to a neighbor eNB as described above, the eNB and the new neighbor eNB may exchange their characteristics through X2AP: X2 Setup procedure.

When the following configuration in an eNB is changed:
Add and/or remove of an antenna endpoint.
Add and/or remove of a PPF instance.
Add and/or removal of a path between an antenna endpoint and an PPF instance.
Changes of characteristics of the path between an antenna endpoint and an PPF instance.

The new and/or removed characteristics may be distributed using the following procedures:
To the MME using S1AP: eNB Configuration Update
To all neighbor eNBs with X2 connection using S1AP: eNB Configuration Update
To all neighbor eNBs without X2 connection using S1AP: eNB Configuration Transfer, where MME will forward it using S1AP: MME Configuration Transfer if MME has S1AP connection to the neighboring eNB, or using S10: Configuration Transfer Tunnel to the MME which has connection to the neighboring eNB.

When the eNB receives characteristics from the neighboring eNB through S1AP: MME Configuration Transfer. The eNB shall send this update to its MMEs using S1AP: eNB Configuration Update.

Figure 19:
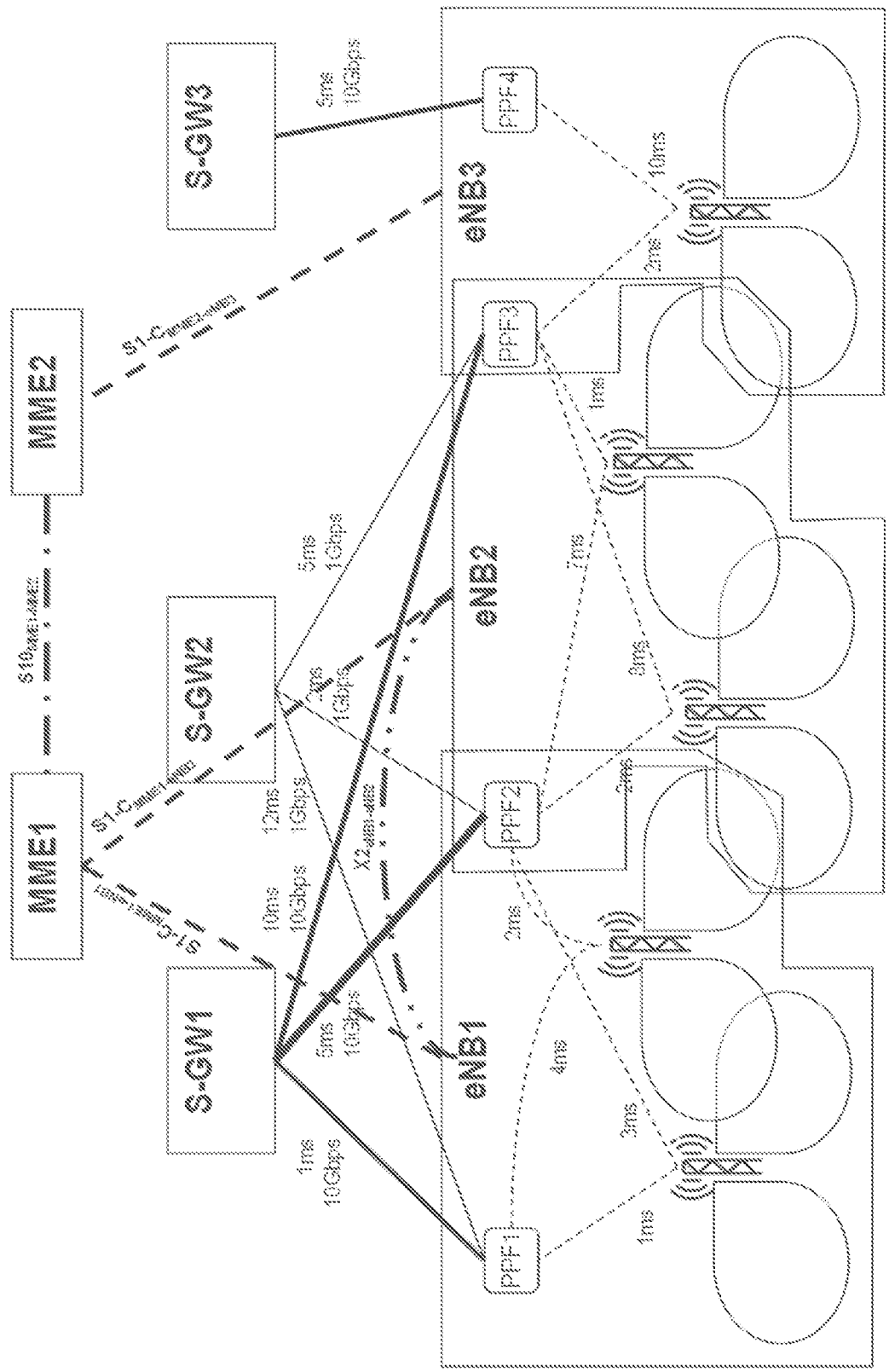
FIG. 19 is a schematic block diagram depicting embodiments of a network.

An example on how the characteristics are distributed with this approach in an example network is described in FIG. 19:

Pre-requisite: MME1 such as the CN node 130 and MME2 are setup and is connected through an S10 interface.

Step 1: eNB1 such as the radio network node 111 connects to MME1.
Characteristics from eNB1 will be sent to MME1 through S1 Setup procedure.

Step 2: eNB2 such as the second radio network node 112 connects to MME1
Characteristics from eNB2 will be sent to MME1 through S1 Setup procedure.

Step 3: eNB3 connects to MME2
Characteristics from eNB3 will be sent to MME2 through S1 Setup procedure.

Step 4: A UE such as the wireless device 120 should be handover from a cell provided by eNB1 to a cell provided by eNB2 for the first time. eNB1 and eNB2 are unknown for each other in this example scenario. Besides a normal handover for the UE they should also transfer the characteristics with each other by:

eNB1 and eNB2 exchange their characteristics with each other, with one of the following methods:
Using S1AP: eNB Configuration Transfer and S1AP: MME Configuration Transfer.
Using X2AP:X2 Setup procedure.

Step 5: An UE should be handover from a cell from eNB2 to a cell from eNB3 (eNB2 and eNB3 are unknown for each other) for the first time. Besides a normal handover for the UE they should also transfer the characteristics with each other by.

eNB2 and eNB3 exchange their characteristics with each other by using S1AP: eNB Configuration Transfer, S10: Configuration Transfer Tunnel, and S1AP: MME Configuration Transfer.
eNB2 distributes the characteristics on eNB3 to MME1 using S1AP: eNB Configuration Update.
eNB3 distributes the characteristics on eNB2 to MME2 using S1AP: eNB Configuration Update.

Step 6: Changes on characteristics occur on eNB1.
eNB1 distributes the changes to MME1 using S1AP: eNB Configuration Update.
eNB1 distributes the changes to eNB2 using X2AP: eNB Configuration Update.

Step 7: Changes on characteristics occur on eNB3.
eNB3 distributes the changes to MME2 using S1AP: eNB Configuration Update
eNB3 distributes the changes to eNB2 using S1AP: eNB Configuration Transfer, S10: Configuration Transfer Tunnel, and S1AP: MME Configuration Transfer.
eNB2 distributes the characteristics changes on eNB3 to MME1 using S1AP: eNB Configuration Update.

Examples of Occasions for Change of Endpoint Pairs for the Transport Path.

Intra eNB Handover

As the characteristics are known within the same eNB, the eNB may by itself decide if change of PPF instance is needed or not. In case change of PPF is needed, the eNB can setup a data forwarding between PPF instance during handover execution phase and issue a path switch procedure during handover completion phase as described in FIG. 20.

Figure 20:
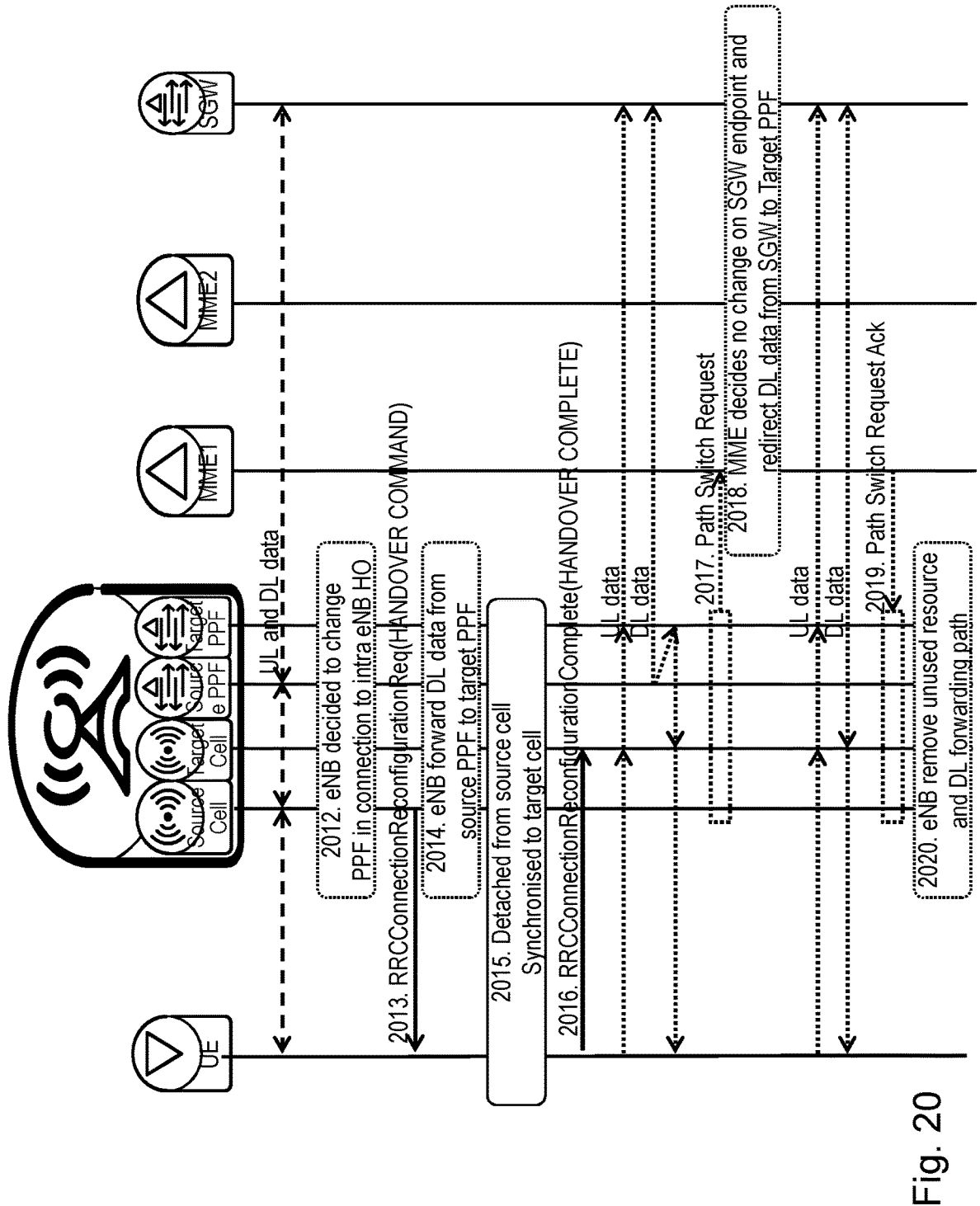
FIG. 20 is a sequence diagram depicting embodiments of a method in a radio communications network.

An example on Intra eNB handover, where change of PPF instance is decided and requested by the eNB and accepted by the MME, with no endpoint change on CN side, is shown in FIG. 20. The new sequences compare to the legacy are marked with dotted lines in the Figure.

See the following example actions and messages in FIG. 20:

2012. eNB decides to change PPF instance in connection to intra eNB HandOver (HO).
2013. RRCConnectionReconfigurationReq(HANDOVER COMMAND).
2014. eNB forwards DL data from source PPF instance to target PPF instance.
2015. Detached from source cellSynchronised to target cell.
2016. RRCConnectionReconfigurationComplete(HANDOVER COMPLETE)
2017. Path Switch Request.
2018. MME decides no change on CN endpoint 1411, 1412, 1421 such as SGW endpoint and redirect DL data from SGW to Target PPF instance
2019. Path Switch Request Acknowkedge.
2020. The eNB removes unused resource and DL forwarding path.

Inter eNB X2 Handover

Figure 21:
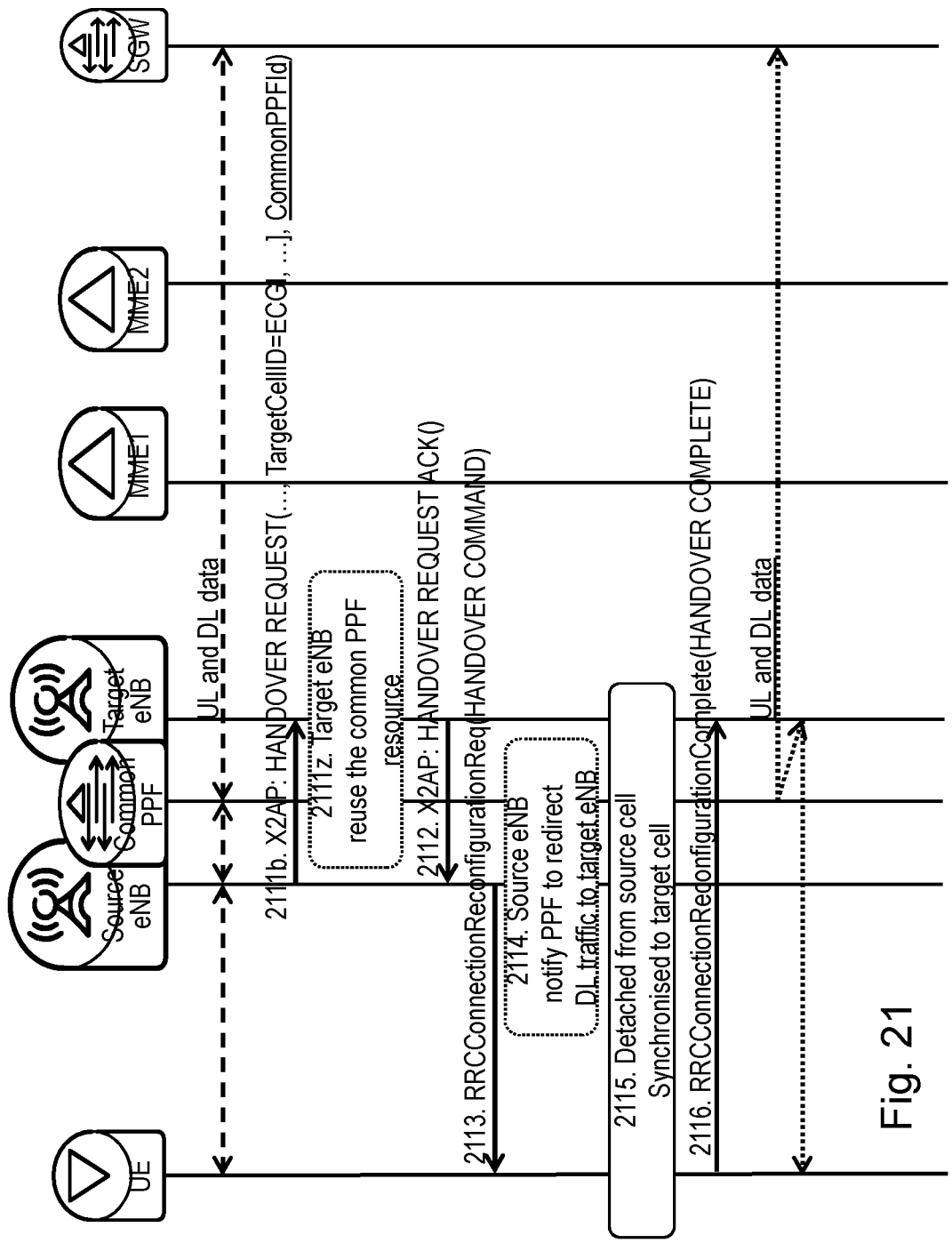
FIG. 21 is a sequence diagram depicting embodiments of a method in a radio communications network.

As the characteristics of the neighboring eNB is already known, already distributed during setup or obtainable via external DB 150, if PPF instance change is necessary, a normal X2 handover will be executed. If the PPF instance changes is not necessary, the source eNB shall in X2: Handover Request notify the target eNB that no PPF instance change is needed, and no path switch procedure shall be executed. FIG. 21 shows the sequence of X2 handover with no PPF change.

The new sequences (compared to the legacy sequences) are marked with dotted lines and underlined text in the Figure.

See the following example actions and messages in FIG. 21 regarding Inter-eNB X2 handover where the neighbour characteristics are known by eNB prior handover occasion, no PPF change needed:

2111b. X2AP: HANDOVER REQUEST( . . . , TargetCellID=ECGI, . . . ], CommonPPFId)
2111z. Target eNB reuse the common PPFresource.
2112. X2AP: HANDOVER REQUEST ACK.
2113. RRCConnectionReconfigurationReq(HANDOVER COMMAND).
2114. Source eNB notify PPF to redirect DL traffic to target eNB.
2115. Detached from source cell Synchronised to target cell.
2116. RRCConnectionReconfigurationComplete(HANDOVER COMPLETE).

Inter eNB S1 Handover

As the characteristics of the neighboring eNB is already known, already distributed during setup or obtainable e.g. via external DB 150, if PPF instance change is necessary, a normal S1 handover will be executed. If PPF instance change is not necessary, the source eNB shall in S1AP: Handover Required/Handover Request message notify the target eNB and MME that no PPF instance change is needed, and no path switch procedure will be executed.

Figure 22:
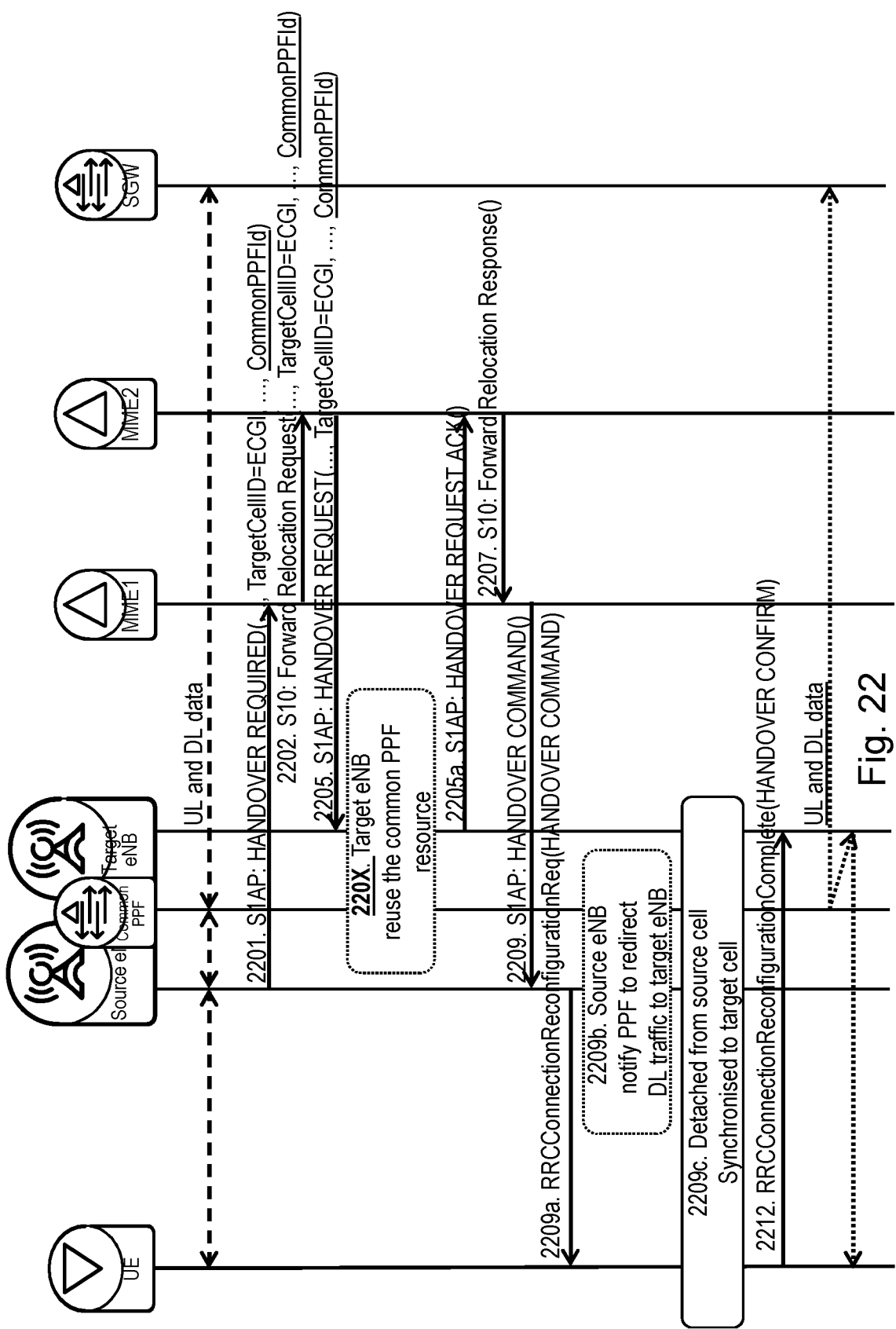
FIG. 22 is a sequence diagram depicting embodiments of a method in a radio communications network.

See the following example actions and messages in FIG. 22 regarding Inter-eNB S1 handover, neighbor characteristics known by eNB prior handover occasion, no PPF change and no SGW change needed. The new sequences compare to the legacy are marked with dotted lines and underlined text in the Figure.

2201. S1AP: HANDOVER REQUIRED( . . . , TargetCellID=ECGI, . . . , CommonPPFId).
2202. S10: Forward Relocation Request( . . . , TargetCellID=ECGI, . . . , CommonPPFId)
2205. S1AP: HANDOVER REQUEST( . . . , TargetCellID=ECGI, . . . , CommonPPFId).
220X. Target eNB reuse the common PPF instance resource.
2205a. S1AP: HANDOVER REQUEST ACK.
2207. S10: Forward Relocation Response.
2209. S1AP: HANDOVER COMMAND.
2209a. RRCConnectionReconfigurationReq(HANDOVER COMMAND).
2209b. Source eNB notify PPF to redirect DL traffic to target eNB.
2209c. Detached from source cell Synchronised to target cell.
2212. RRCConnectionReconfigurationComplete(HANDOVER CONFIRM)

eNB Initiated Change of PPF Due to Changes of Characteristics

As the characteristics are known within the same eNB, eNB can by itself decide if change of PPF is needed or not. This procedure has big similarity to intra-eNB handover case, where the eNB can setup a data forwarding between PPF and then issue a path switch procedure for switching path between CN and RAN.

In case CN endpoint also needs to be changed, the procedure according to FIG. 20 will be followed.

Figure 23:
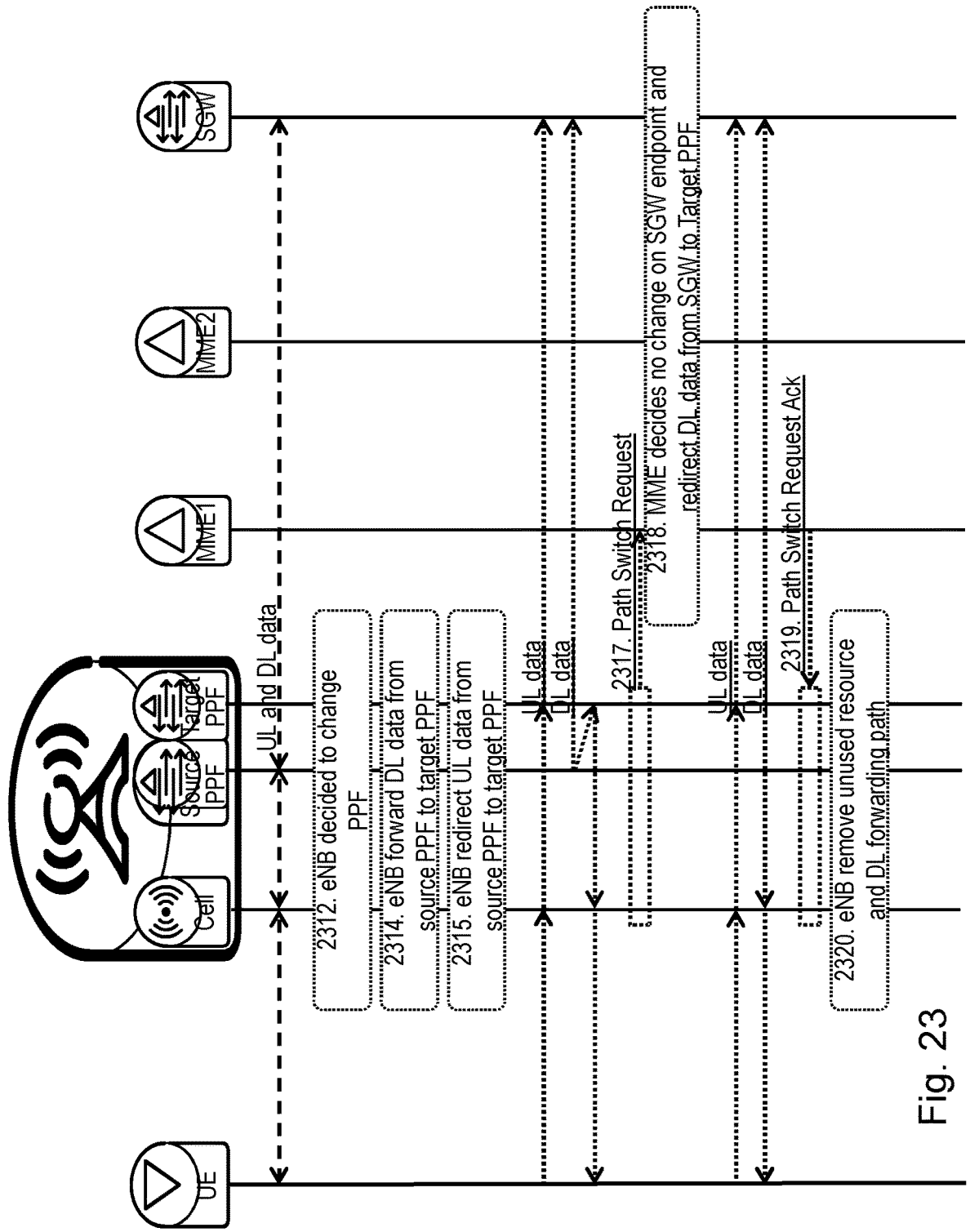
FIG. 23 is a sequence diagram depicting embodiments of a method in a radio communications network.

An example on eNB initiated change of PPF is shown in FIG. 23 below. The new sequences compare to the legacy are marked with dotted lines and underlined text in the Figure. See the following example actions and messages in FIG. 23 regarding eNB initiated change of PPF due to changes of characteristics. The new sequences compare to the legacy are marked with dotted lines and underlined text.

2312. eNB decides to change PPF instance.
2314. eNB forward DL data from source PPF instance to target PPF instance.
2315. eNB redirect UL data from source PPF instance to target PPF instance
2317. Path Switch Request.
2318. MME decides no change on SGW endpoint and redirect DL data from SGW to Target PPF.
2319. Path Switch Request Ack.
2320. eNB remove unused resource and DL forwarding path.

MME initiated change of PPF due to changes of characteristics This procedure is possible as the characteristics of the neighboring eNB is already known (already distributed during setup or accessible via external DB). A new signaling procedure need to be created for initialize PPF change on a certain UE, with new PPF-id as parameter. The remaining procedure is the same as eNB initiated change of PPF case.

Figure 1:
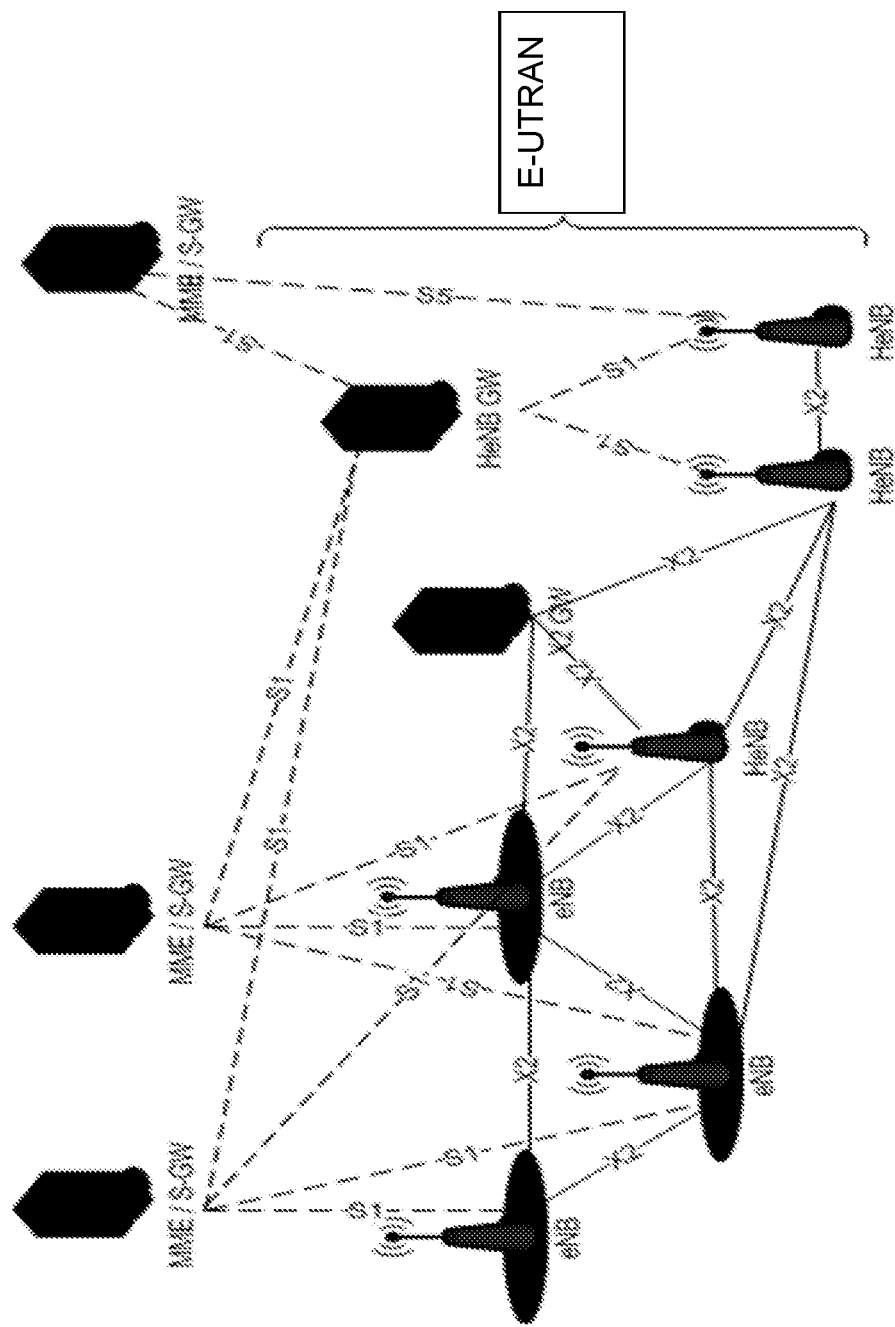
FIG. 1 is a schematic block diagram illustrating prior art.
Figure 2:
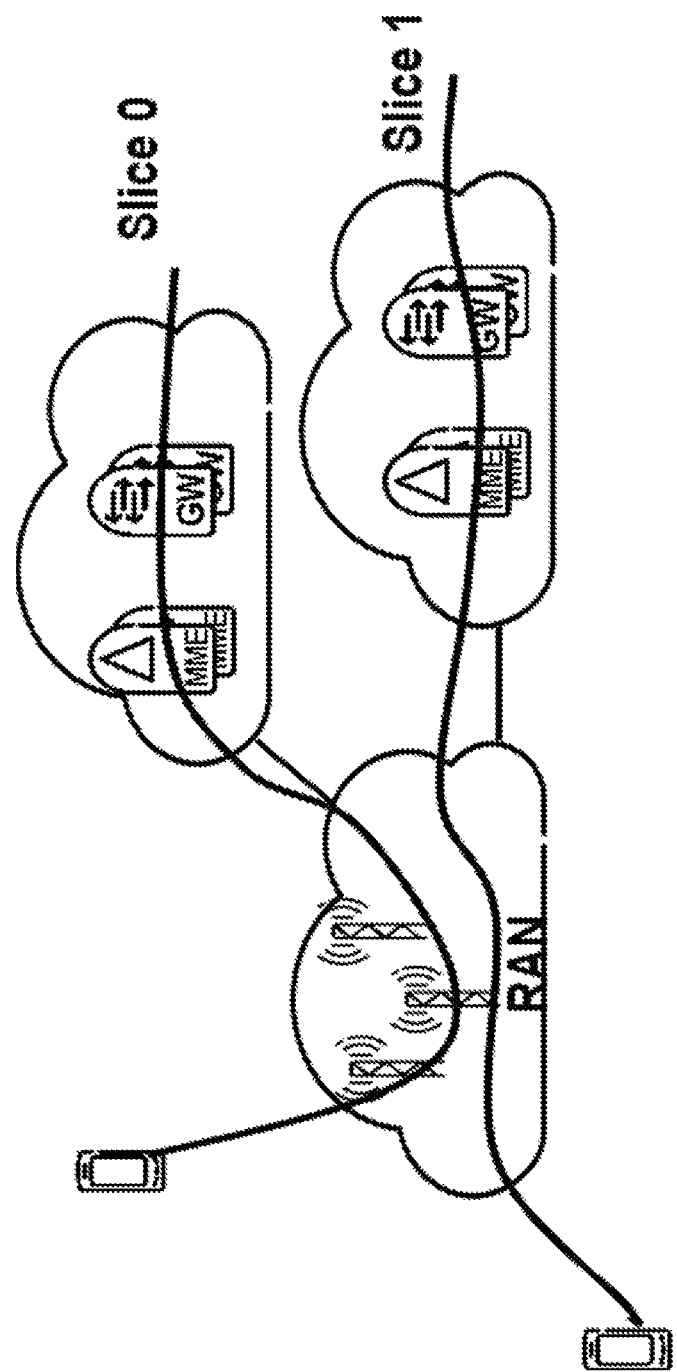
FIG. 2 is a schematic block diagram illustrating a prior art.
Figure 3:
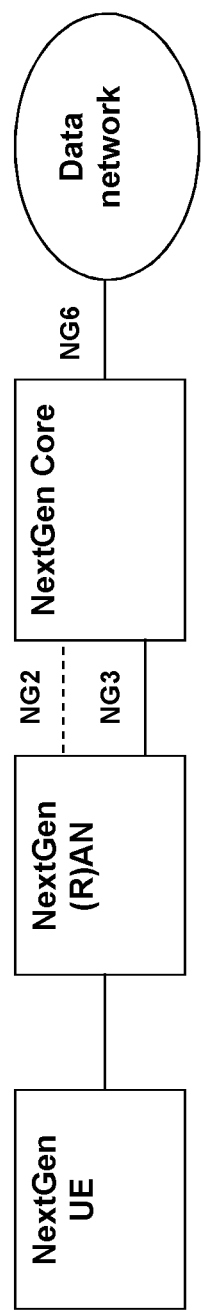
FIG. 3 is a schematic block diagram illustrating a prior art.
Figure 4:
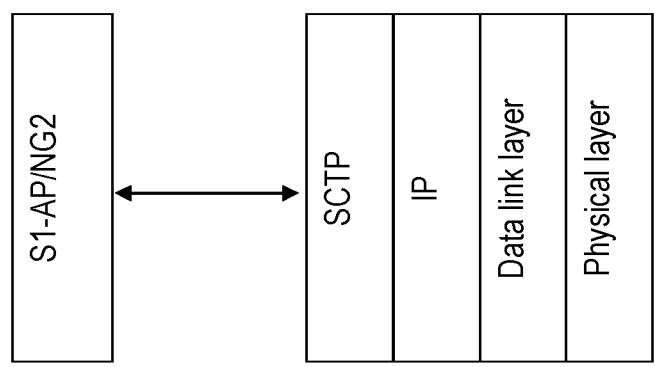
FIG. 4 is a schematic block diagram illustrating a prior art.
Figure 5:
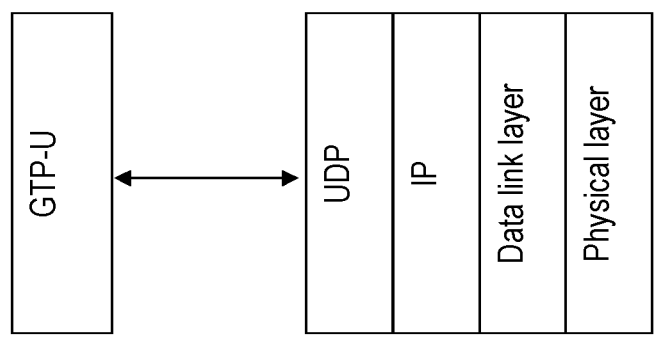
FIG. 5 is a schematic block diagram illustrating a prior art.
Figure 6:
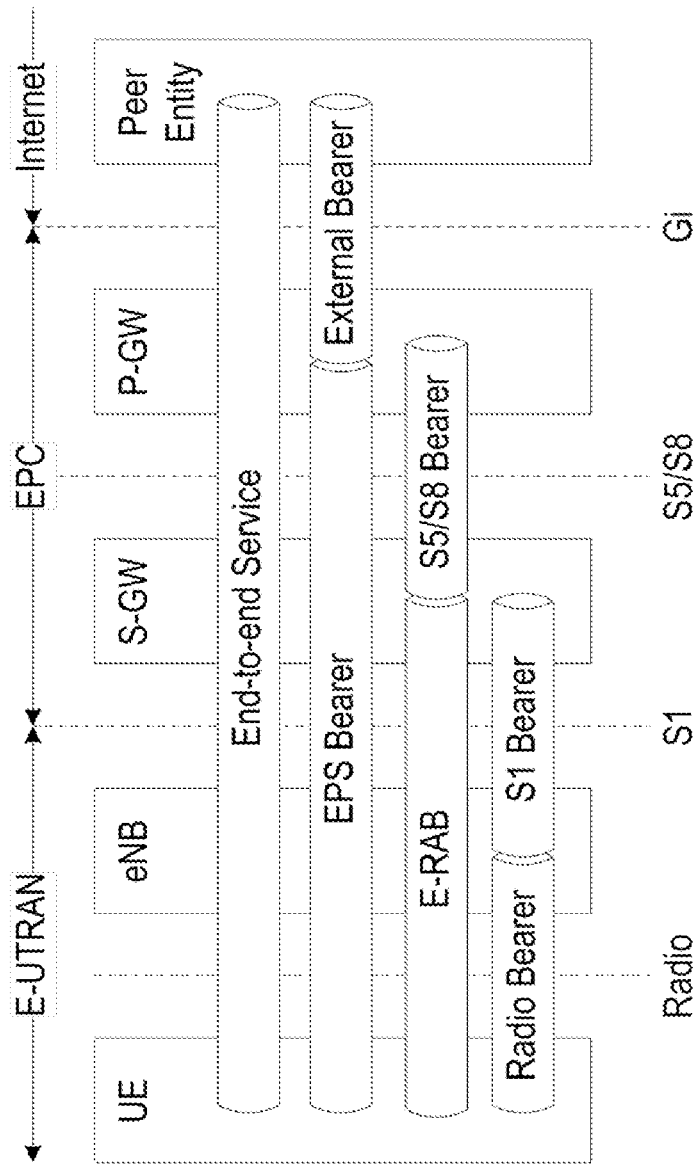
FIG. 6 is a schematic block diagram illustrating a prior art.
Figure 7:
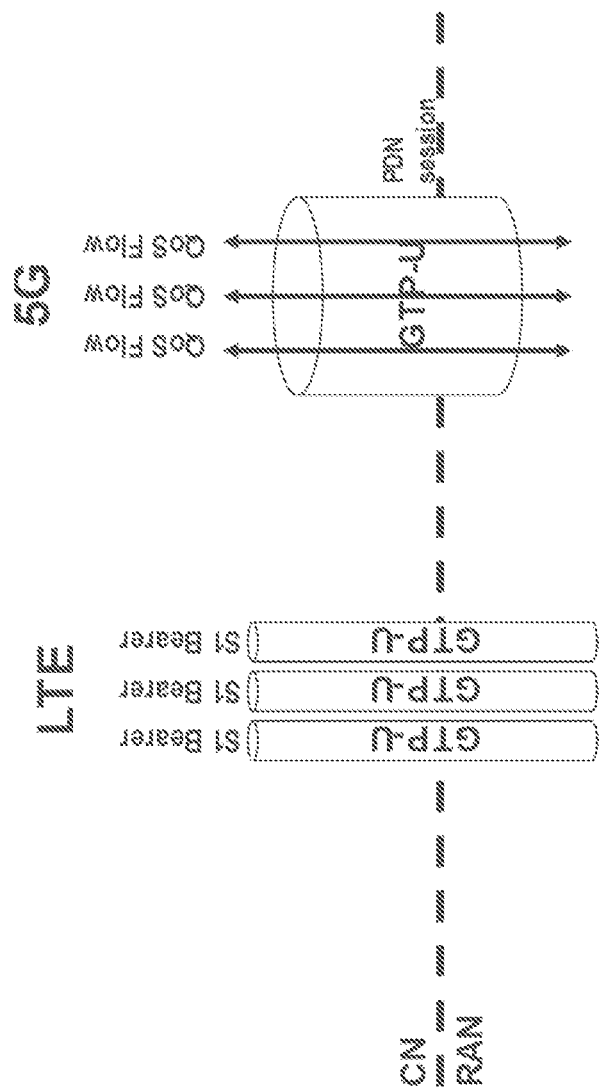
FIG. 7 is a schematic block diagram illustrating a prior art.
Figure 8:
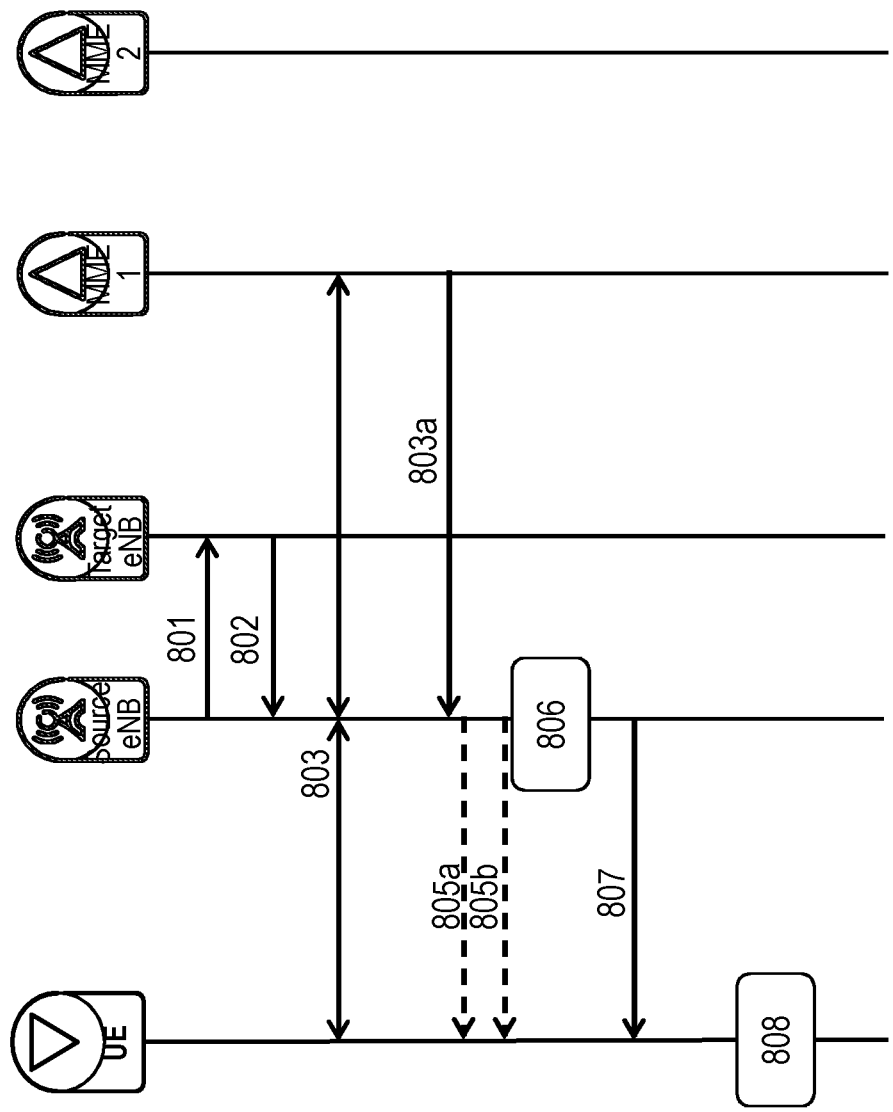
FIG. 8 is a sequence diagram illustrating a prior art.
Figure 9:
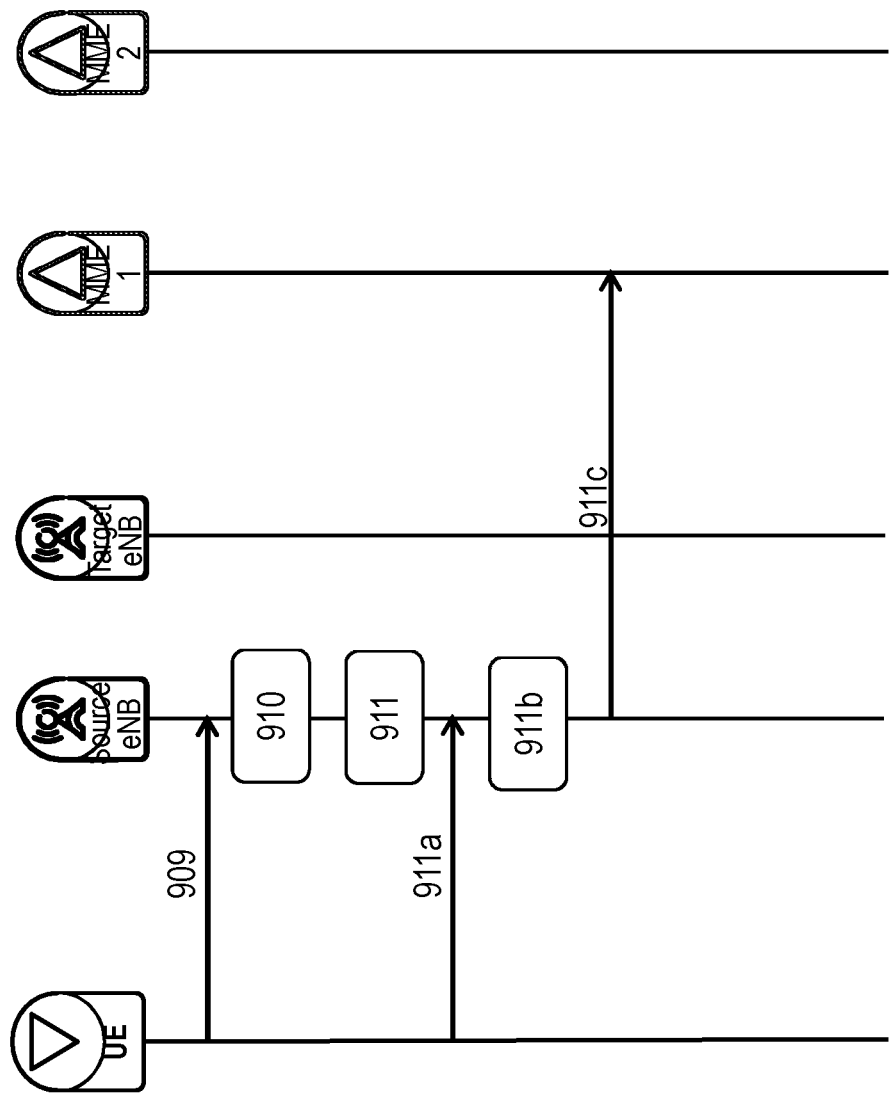
FIG. 9 is a sequence diagram illustrating prior art.
Figure 10:
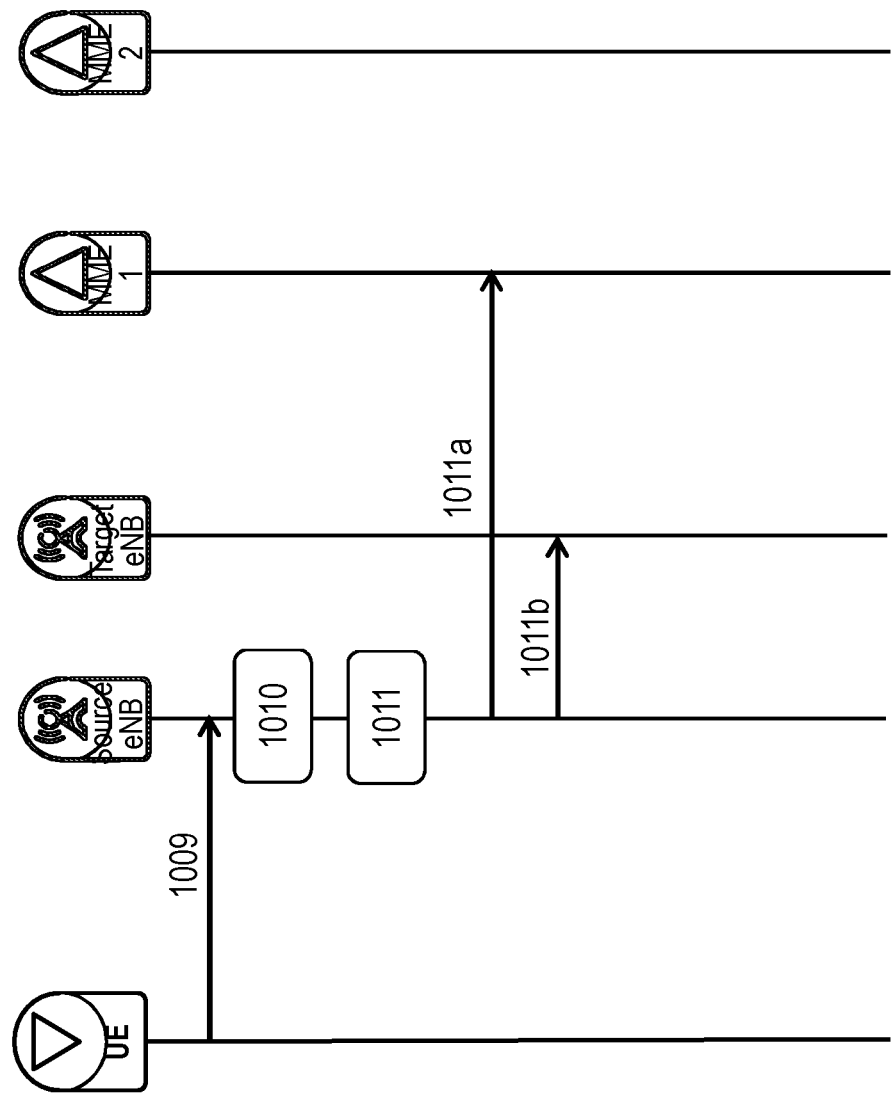
FIG. 10 is a sequence diagram illustrating a prior art.
Figure 11:
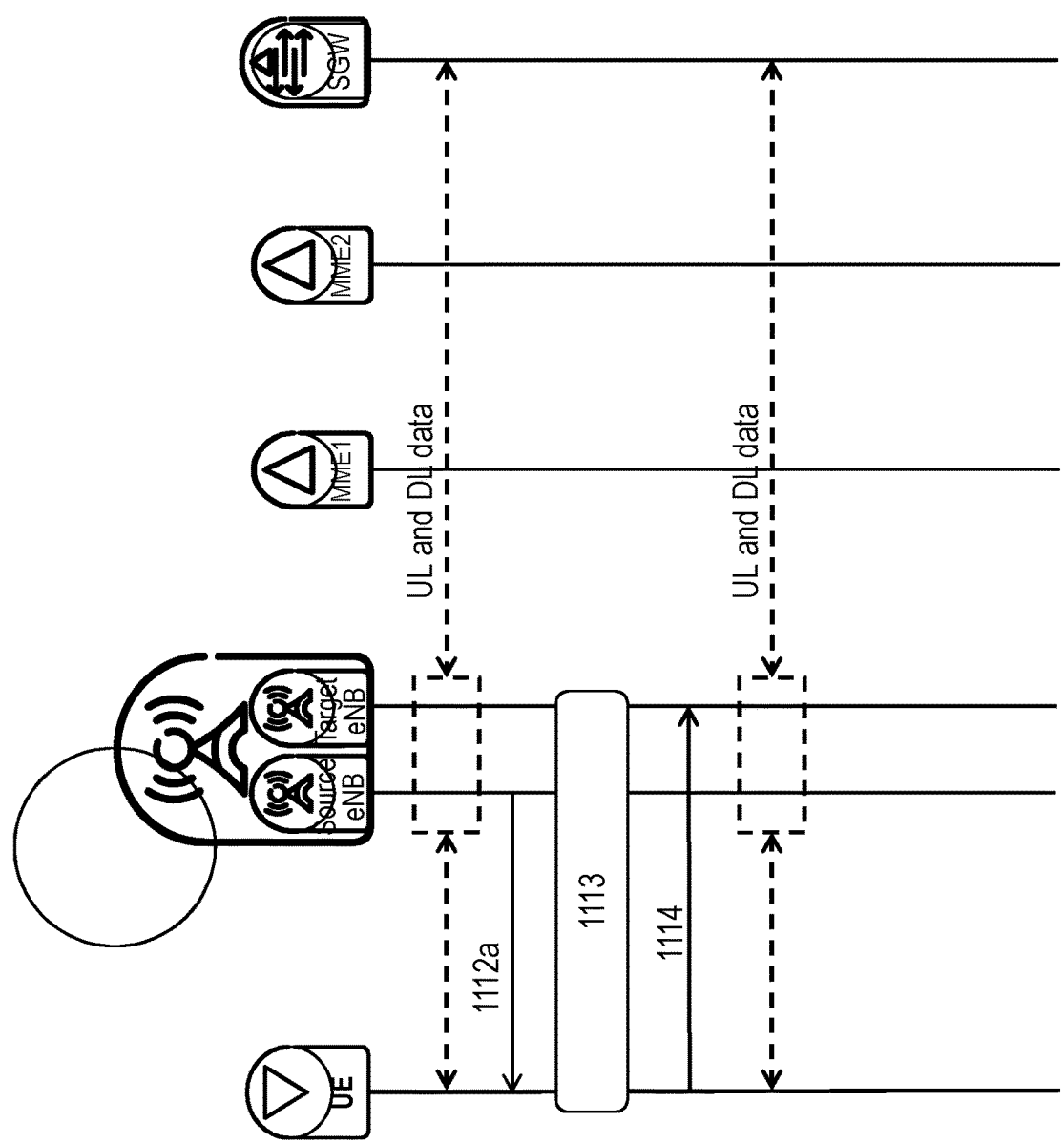
FIG. 11 is a sequence diagram illustrating a prior art.
Figure 12:
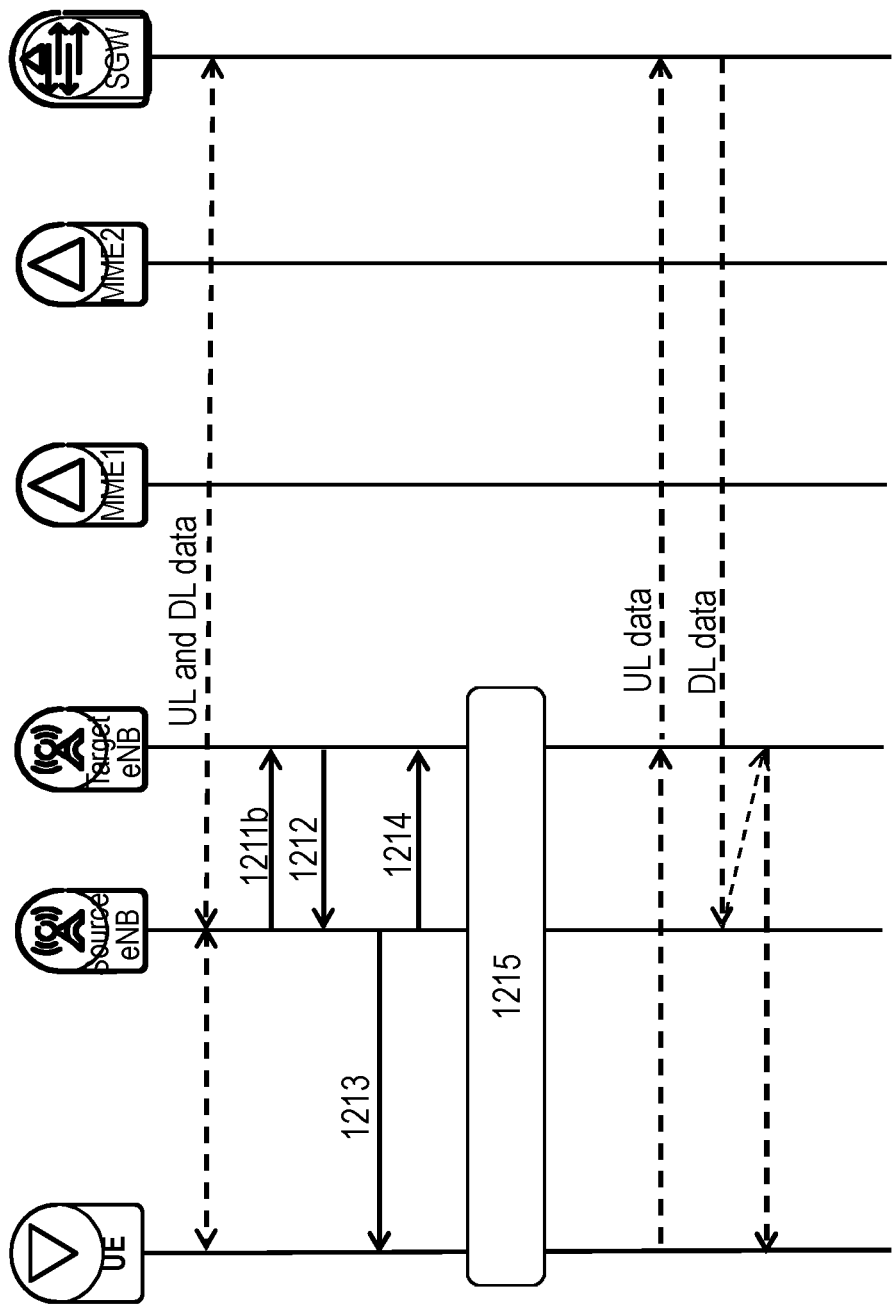
FIG. 12 is a sequence diagram illustrating a prior art.
Figure 13:
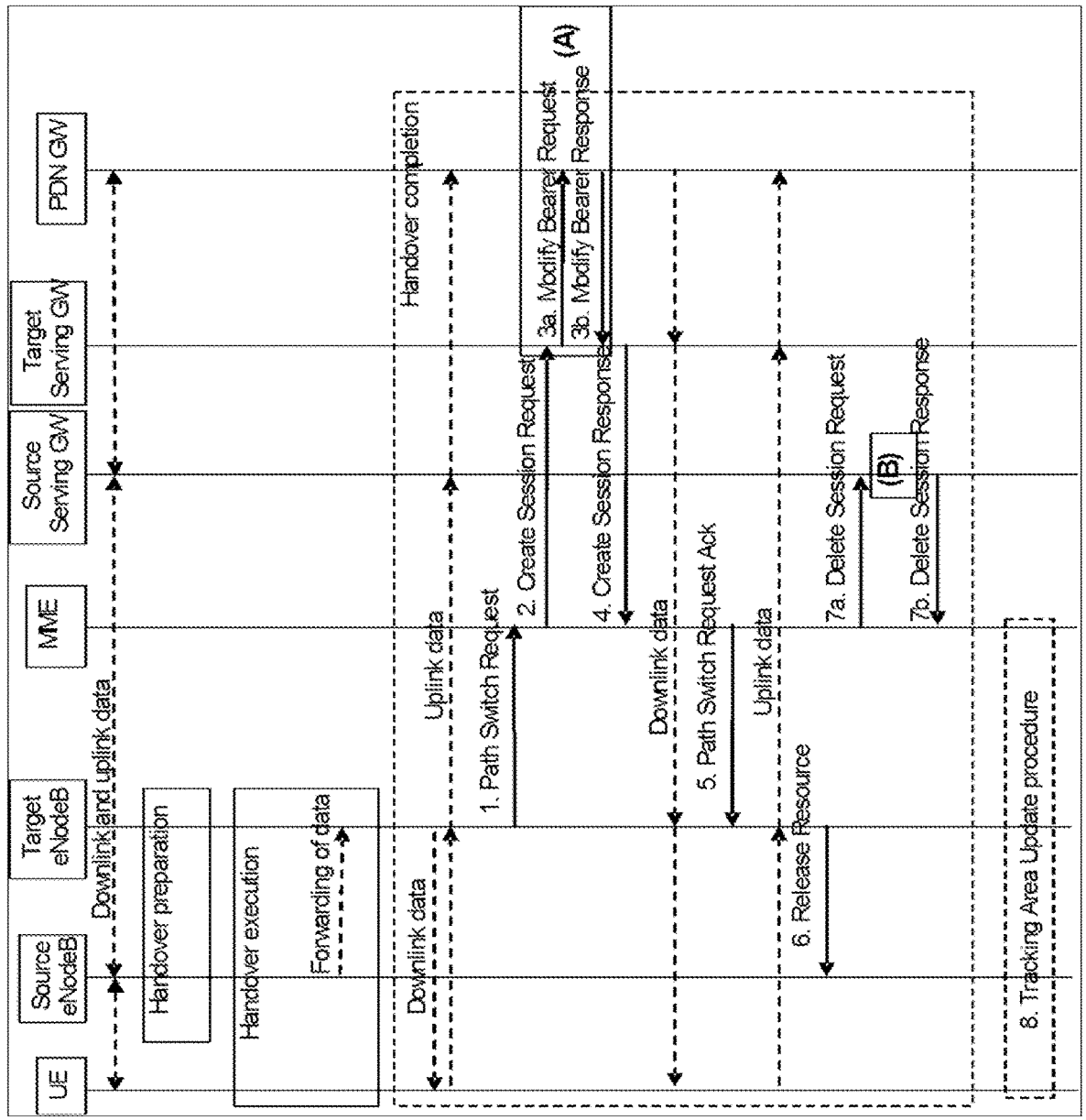
FIG. 13 is a sequence diagram illustrating a prior art.
Figure 14:
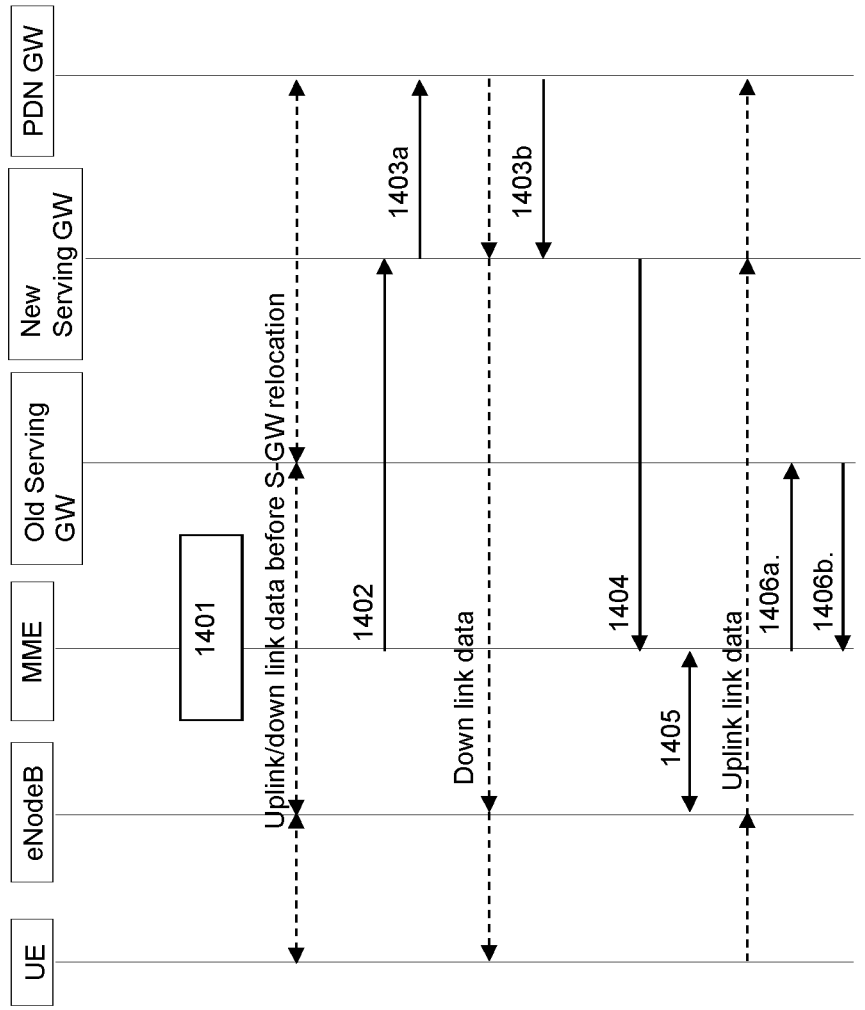
FIG. 14 is a sequence diagram illustrating a prior art.

In case CN endpoint also needs to be changed, the procedure according to FIG. 13 will be followed.

Figure 24:
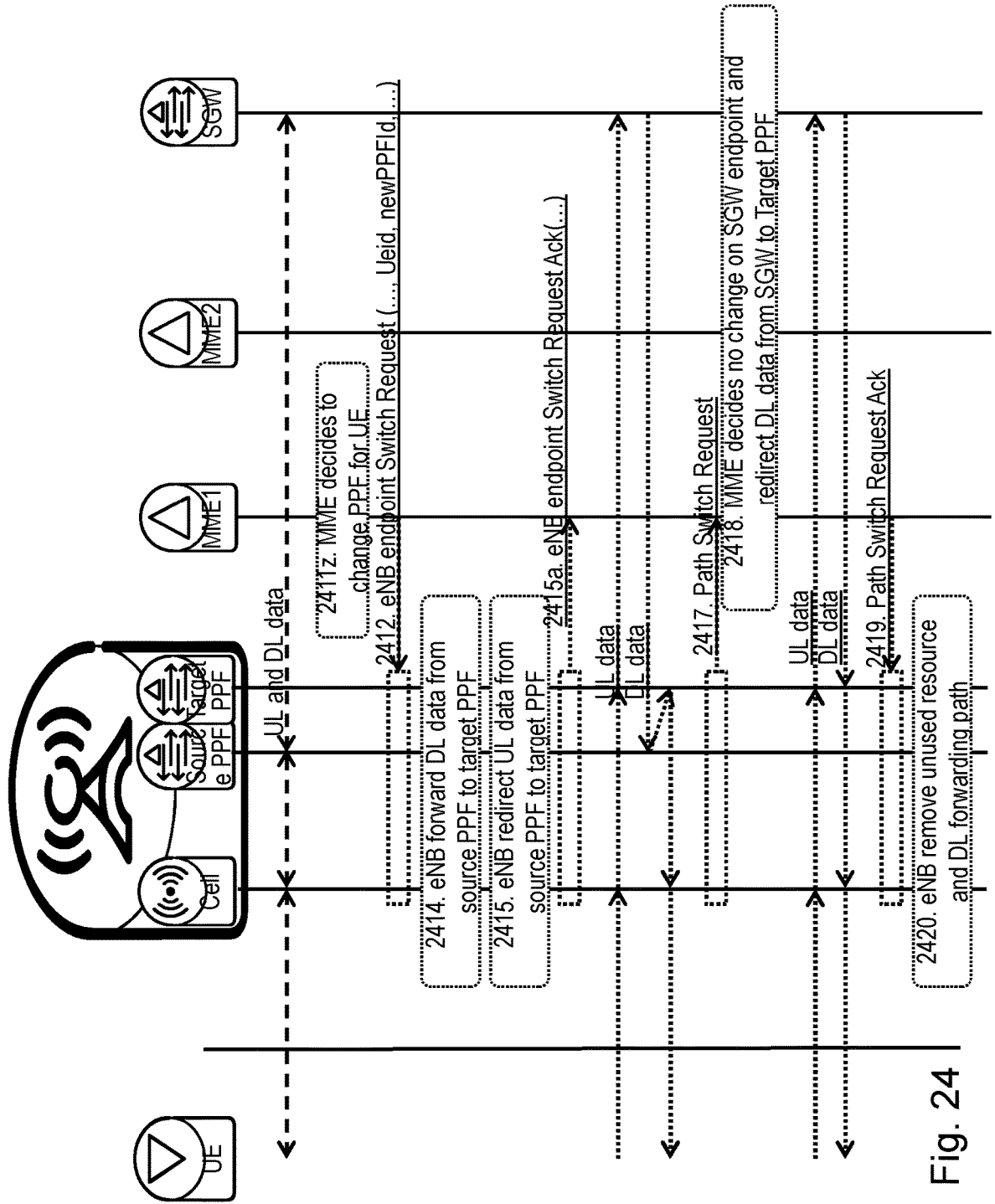
FIG. 24 is a sequence diagram depicting embodiments of a method in a radio communications network.

See the following example actions and messages in FIG. 24 regarding MME initiated change of PPF due to changes of characteristics. The new sequences compare to the legacy are marked with dotted lines and underlined text.

2411z. MME decides to change PPF instance for UE.
2414. eNB forwards DL data from source PPF instance to target PPF instance.
2415. eNB redirects UL data from source PPF instance to target PPF instance.
2415a. eNB endpoint Switch Request Ack( . . . ).
2417. Path Switch Request.
2418. MME decides no change on SGW endpoint and redirect DL data from SGW to Target PPF instance.
2419. Path Switch Request Ack.
2420. eNB removes unused resource and DL forwarding path.

Characteristics Distribution Method to the Related RAN and CN Nodes, and Mechanism for Controlling Transport Path Changes Such as Endpoint Pair Changes During Cell Changes and/or Other Occasions—Characteristics Distribution During Demanding Occasion Characteristics Distribution Principle In this approach, Characteristics distribution during demanding occasion, only necessary characteristics needed for the node will be stored locally in the radio network node 111 and CN node 130 such as the LTE eNB and MME. The information will be distributed between the nodes first when there is a need, e.g. during handover occasion, triggering endpoint pair changes due to changes in characteristics.

The basic principles may be as follows:

1. The Source eNB, such as e.g. the radio network node 111 informs the target eNB, such as e.g. the radio network node 112 about used PPF instances and possible PPF instances when a handover event is to be triggered, the source RAN includes information, such as e.g. PPF instance identities, data center identities, and path characteristics.

2. The target eNB such as e.g. the network node 111, 112 evaluates if the used PPF instance can be re-used, or if a new PPF instances should be selected.
   a. If a new PPF instance should be selected, then a new S-GW may need to be selected, the target eNB indicates this to the CN node 130 such as the MME, the target eNB also includes information about suitable PPF instances. I.e. information about potential PFF instances, such as PPF instance identities, data center identities, path characteristics.
   b. The CN node 130 then selects a CN endpoint such as an S-GW based on information received from the target eNB, and informs the target eNB about a preferred PPF instance.

A possible variant for step 2 is that the CN node 130 such as the MME informs the target eNB that the CN endpoint such as the S-GW needs to be changed, the CN node 130 may also include a list of preferred CN endpoint such as S-GWs and information about the S-GW, such as data center identities. Then the target eNB has the possibility to influence the CN endpoint such as S-GW selection by providing information about potential PPF instances, i.e. information about available PFF instances, such as PPF identities, data centre identities, path characteristics so that the best CN endpoint Such as S-GW and PPF instance pair i.e. S-GW/PPF pair can be selected. This CN endpoint—PPF instance pair is the first part of the transport path as mentioned above.

The selection of S-GW/PPF endpoint pair may be per E-RAB.

In case of more than one radio path, e.g. dual connectivity or equivalent 5G concepts for multipath handling, the characteristics of all relevant paths should be considered when proposing suitable PPF instances.

The distribution of characteristics may be done through the following interfaces and procedures.
  X2-AP: Handover Request
  X2-AP: Handover Request Acknowledge
  S1-AP: Path Switch Request
  S1-AP: Path Switch Request Acknowledge
  S1-AP: Handover Required
  S1-AP: Handover Request In some cases, new signals are also required for distribution during on demand occasion. These new and modified sequences, e.g. addition of information compared to the legacy are marked in bold text in FIGS. 25-27 and is described in examples in the next chapter.

Change of Transport Path Such as Endpoint Pairs Occasions (Including Characteristics Distribution), Example 1: Inter-eNB S1 Handover, with Changing of RAN/CN Endpoint Pairs, Characteristics Distributed on Demand Occasion Handover signalling is preferably enhanced with information about selected data center and/or characteristics in order to facilitate the selection of suitable end point pairs.

Three different example implementations provided.
1. The Core NW such as the CN node 130 do not change CN endpoint such as S-GW, Target RAN such as the target radio network node checks if used PPF can be kept.
2. Core NW such as the CN node 130 wants to change CN endpoint such as S-GW, early check with target radio network node if suitable PPF instance is available.
3. Core NW such as the CN node 130 wants to change CN endpoint such as S-GW, late check with target radio network node and if no suitable PPF instance, target radio network node initiates re-negotiation.

Common for the different variants is that the transparent container from source radio network node 111, such as the source eNB, includes new information about the used PPF instance, such as the PPF location, e.g. the AreaID that indicates used data center, and characteristics for the RAN transport path also referred as the second part of the transport path.

Core NW do not Change S-GW, Target RAN Checks if Used PPF can be Kept

Figure 25:
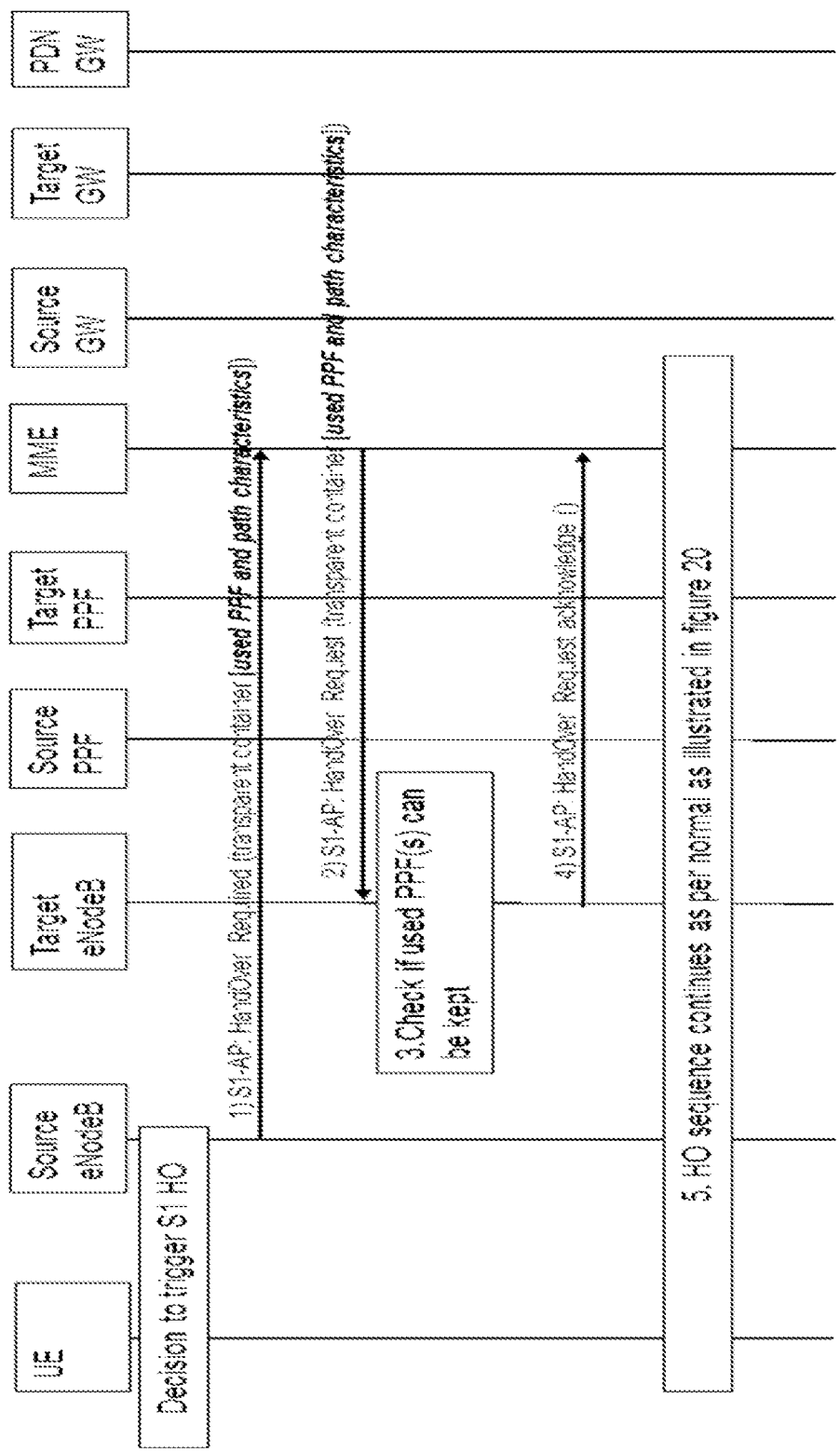
FIG. 25 is a sequence diagram depicting embodiments of a method in a radio communications network.

See the following example actions and messages in FIG. 25 regarding core NW do not change S-GW, Target RAN checks if used PPF can be kept
1. The source eNB includes new information in the transparent container, i.e. information about the current used PPF instance, such as the PPF location, e.g. the AreaID that indicates used data center, and characteristics for the RAN path such as the second part of the transport path.
2. The MME forwards this to the target eNB such as the second radio network node 112
3. The target eNB such as the second radio network node 112 checks if the used PPF instance is among the PPF instances the target eNB can use, and if the characteristics of the RAN path is good enough.
4. In this example the PPF instance can be reused, so the target eNB responds with Handover request acknowledge.
5. The HO sequence continues.

If the PPF instance cannot be reused, i.e. check in step 3 failed, and the target eNB is needed to select another PPF instance, the target eNB may initiate a reselection of the CN endpoint such as S-GW as described above.

Figure 26:
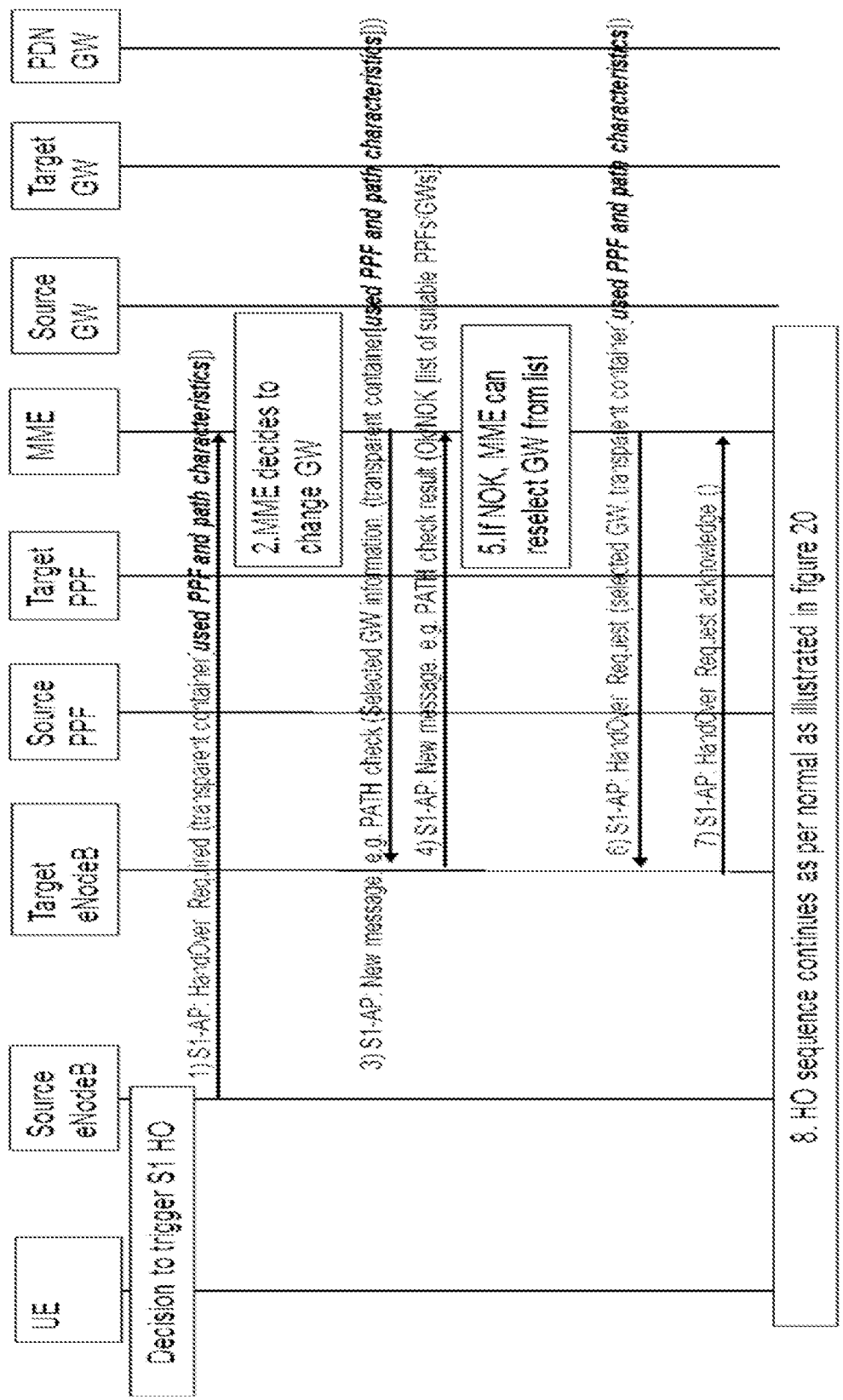
FIG. 26 is a sequence diagram depicting embodiments of a method in a radio communications network.

Core NW Such as the CN Node 130 Wants to Change CN Endpoint Such as S-GW, Early Check with Target eNB if Suitable PPF Instance is Available See the following example actions and messages in FIG. 26 regarding Core NW wants to change S-GW, early check with target eNB if suitable PPF instance is available
1. Source eNB decides a HO is required and sends HandOver Required message to MME.
2. MME decides to change S-GW,
3. MME initiates a check with target eNB and sends information about target (new) S-GW (e.g. AreaID for S-GW) to target eNB such as the radio network node 112 and forwards the received transparent container with information about used PPF instance in new message.
4. The target eNB checks if the used PPF instance can be reused with maintained characteristics, e.g. if the S-GW and PPF instance are located in the same data center (indicated by same AreaID) and if the RAN path characteristics are sufficient. If PPF instance can be reused and characteristics sufficient, the target eNB responds to MME that selected S-GW is ok.
5. If the used PPF instance cannot be reused, the target RAN indicates this to MME and includes a list of available PPF instances, the related RAN characteristics and information about the PPF instances such as the AreaID. (the list could include one PPF). The MME can then select a suitable -S-GW. E.g. one S-GW located in the same data center (same AreaId).
6. The MME indicates the selected S-GW in the Handover request message to the target eNB.
7. The target eNB acknowledge the handover.
8. The HO sequence continues as normal.

Figure 27:
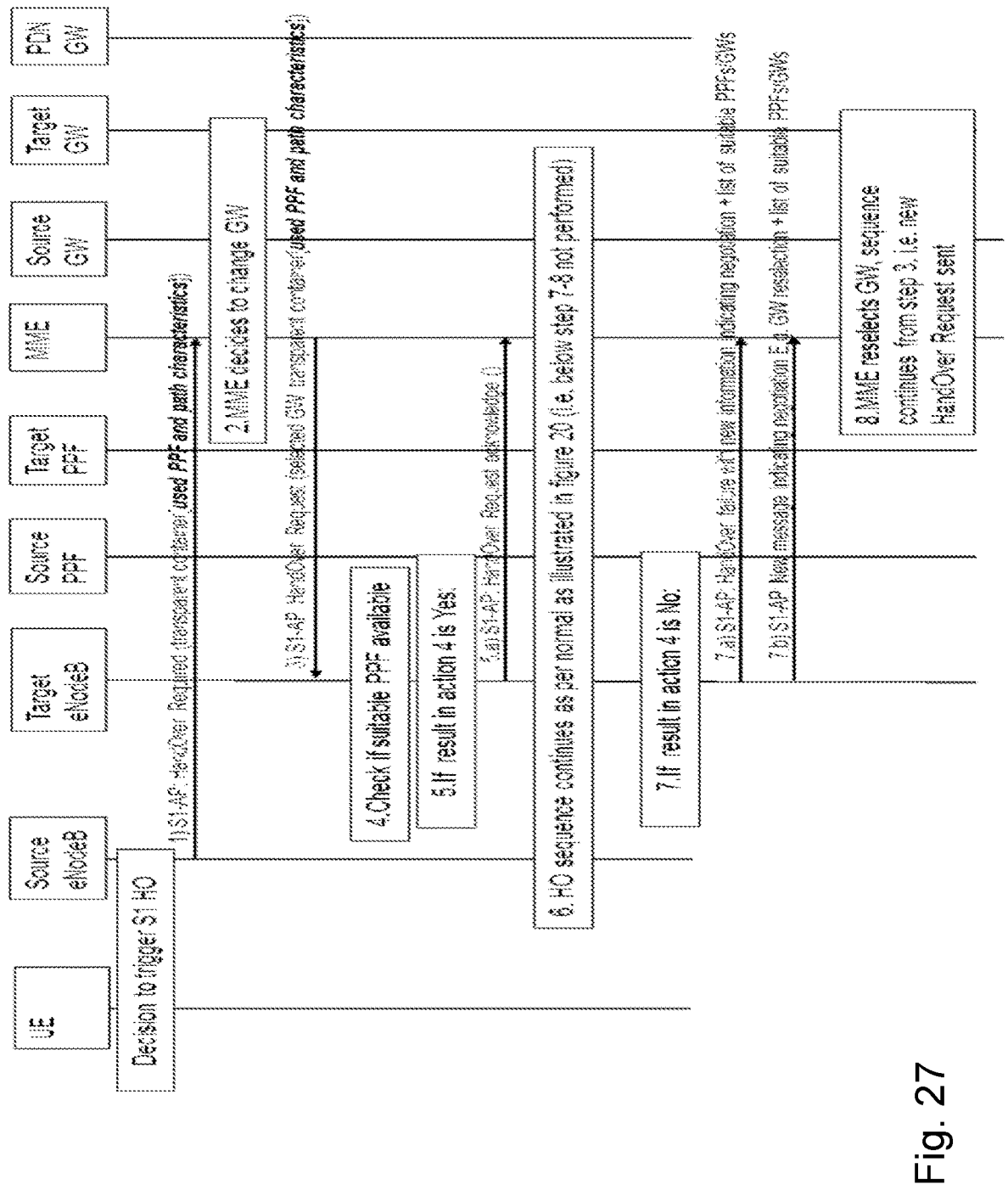
FIG. 27 is a sequence diagram depicting embodiments of a method in a radio communications network.

Core NW Wants to Change S-GW, Late Check with Target RAN and if No Suitable PPF, Target RAN Initiates Re-Negotiation See the following example actions and messages in FIG. 27 regarding 1. Source eNB decides a HO is required and sends HandOver Required message to the CN node 130 such as the MME.

2. The MME decides to change CN endpoint such as S-GW,

3. The MME sends handover request to the target eNB such as the radio network node 111 and includes information about target (new) S-GW and the received transparent container with information about used PPF instance.

4. The target eNB checks if the used PPF instance can be reused with maintained characteristics.

5. If the used PPF instance can be reused, can the target eNB responds to MME that selected S-GW is ok with the handover request acknowledge message.

6. The handover sequence continues a normal, i.e. the below steps are not executed.

7. If used PPF instance cannot be reused, the target RAN indicates this to MME and includes a list of available PPF instances, the related characteristics and information about the PPF instances such as the AreaID, the list may include one PPF instance.

That no suitable PPF instance is available could be informed in different ways, e.g:

7a) New information in the handover failure message, that indicates that a S-GW reselection is needed and information about suitable PPF instances.

7b) With a new message to indicate S-GW reselection and information about suitable PPF instances. These messages may also include information about action to take if reselection of suitable S-GW fails, i.e. continue set-up with non optimal S-GW or drop session to prevent a deadlock.

8. The MME may then select a suitable -S-GW, e.g. with same AreaId as the PPF instance and good RAN characteristics. The MME indicates the selected S-GW in the Handover request message to the target eNB. Possibly also indicate that set-up should continue even if not optimal PPF instance/S-GW pair.

The HO sequence continues as normal.

Change of Endpoint Pairs Occasions (Including Characteristics Distribution), Example 2: Inter-eNB X2 Handover, without Changing the RAN/CN Endpoint Pairs The scenario describes the procedure of handing over a UE from one eNodeB to another via X2 and changing the PPF. These examples also involves dual connectivity.

Figure 28:
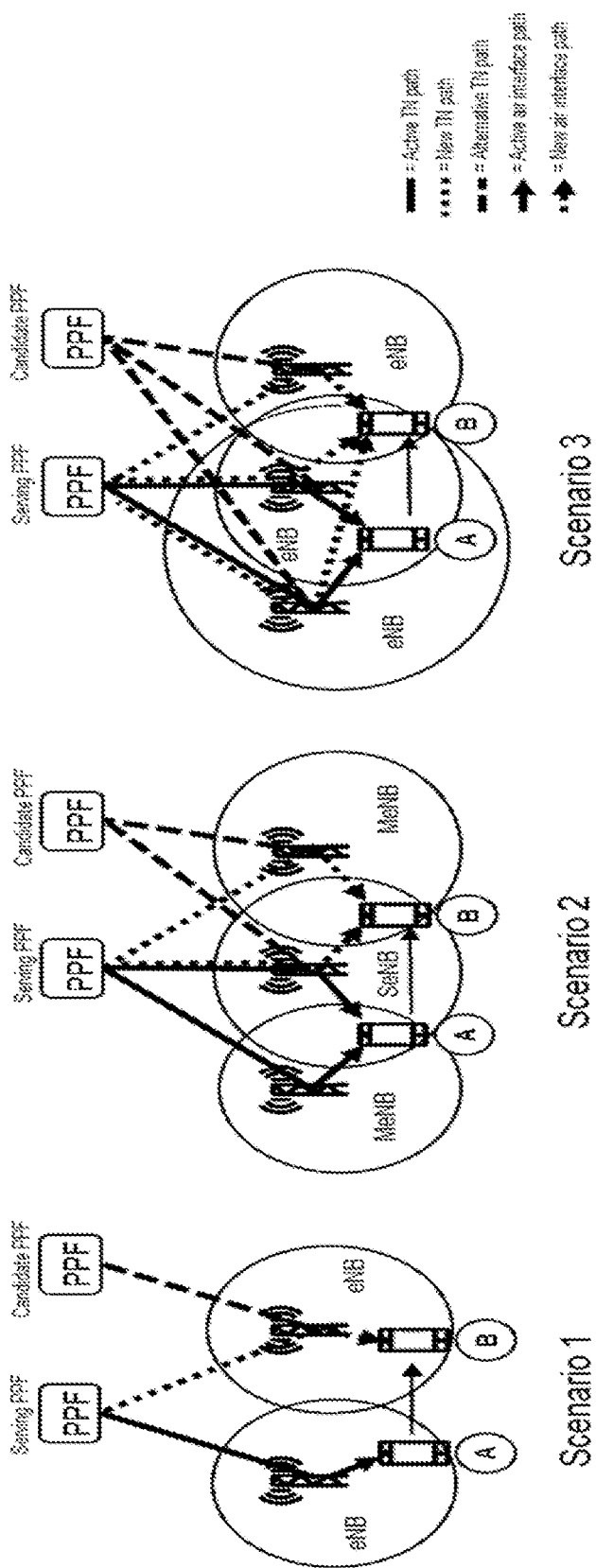
FIG. 28 is a schematic block diagram illustrating embodiments of scenarios in a radio communications network.

There are several possible scenarios, for example. FIG. 28 depicts three scenarios.

In scenario 1 the UE (A) has a single active air interface path in one eNB and moves into another eNB (B). In this case the Transport Network (TN) path between antenna endpoint and PPF instance shall be switched to antenna endpoint in the new eNB from the serving PPF instance, or a new candidate PPF instance shall be selected for the single path.

In scenario 2 the UE (A) has two active air interfaces paths via two eNBs and moves into an area (B) where a new air interface path shall be added, from the serving PPF instance to the new eNB, and an old one removed, or alternatively a new PPF instance shall be selected, connecting both paths. In LTE, this would be managed as a dual connectivity case but it is assumed that 5G will support more multipath options. It shall also be noted that with the PPF instance being separated from the lower layers and potentially located at a higher aggregation level in the network Master eNB/Secondary eNB (MeNB/SeNB) roles of LTE may change and several changes may be introduced in various interfaces. The selection of a PPF shall preferably consider the paths from all involved eNBs.

Scenario 3 is similar but in this case a path is added but none is removed i.e. the target is three air interface paths and TN paths.

It shall also be noted that the PPF instance selection and path structure may be different for each E-RAB.

There are at least three options for the procedure:

1 Reselection of PPF instance during the handover completion phase on request from CN.

2 Coordinated reselection of PPF instance and S-GW between RAN and CN during the handover preparation phase.

3 Speculative PPF instance reselection by RAN such as the radio network node 111, during handover preparation with possible reselection during handover completion phase.

A TP is a Transmission Point or cell or similar in the description below.

A Path refers to a connection between a PPF instance and the lower layers in an eNodeB/Secondary (S)eNB.

Option 1:

In this option the RAN such as the RAN 102 assumes that the serving PPF instance of each E-RAB shall be kept until told otherwise by the CN 104, in which case a reselection will be done late, during the handover completion phase. Signaling related to multipath (e.g. dual connectivity) is illustrative only.

The handover preparation phase signaling must be modified to allow all involved eNodeBs determine if the serving PPF instances may be used and to estimate the path cost of candidate PPF instances.

During the Handover Preparation Phase:

1 In the X2-AP: HANDOVER REQUEST message and for each E-RAB the source eNB shall include information that identifies the serving PPF instance, the path cost from each existing TP to the serving PPF instance and the identity of the eNodeB controlling the TP. The serving PPF is identified with the following IEs; 1) a ServingEntityEndpoint identifies the actual TNL (Transport Network Layer) address and GTP Tunnel Endpoint IDentifier (TEID) of the serving PPF, 2) an optional identifier ServingEntityAreaID identifies e.g. in which data center the PPF is located and 3) an optional vendor specific transparent information element, ServingEntityInfo, identifies the PPF instance, and may carry other parameters, in a vendor specific manner. The path costs are expressed in terms of latency and obtainable bandwidth and potentially other properties. The identity of the controlling eNodeB of each TP is identified using suitable IEs in the multipath case.

2 The target eNB such as the radio network node 111 allocates internal resources for every accepted E-RAB and performs a RAN internal path cost calculation between the TP selected for handover, the allocated and potentially dispersed internal resources, and each candidate PPF (including the serving PPF).

The cost calculation may be based on actual or configured characteristics between these internal resources and the PPF instance or synthetic cost figures assigned to the PPF instances. Characteristics include at least latency but can also include obtainable bandwidth and other parameters. The list may be stored for use during the handover completion phase.

For each accepted E-RAB the target eNB also validates that it has connectivity towards the serving PPF instance from the internal resources. This can be done in a variety of ways e.g. by querying an SDN database using some unique identifier of the entities, performing a connection test towards the PPF instance or accessing already available information about established connections between the internal resources and any available PPF instances.

3 Conditionally, if there is more than one eNodeB providing paths to the UE, each applicable secondary eNodeB is contacted.

4 Each SeNB performs a similar path cost estimation from its internal resources to each candidate PPF instance.

5 A message containing the path cost estimations of each E-RAB and candidate PPF is returned.

6 If any serving PPF instance is unreachable from the target eNodeB the request is rejected with X2-AP: HANDOVER PREPARATION FAILURE and an S1 handover procedure may be attempted by the source eNodeB. The resources in the target eNodeB are released.

7 The target eNodeB responds with X2-AP: HANDOVER REQUEST ACKNOWLEDGE as today.

8 For each accepted E-RAB the source eNodeB modifies each serving PPF to forward down link packets to the target eNodeB and stop sending packets to the Source eNodeB or alternatively the packets are duplicated for some time.

The UE may then be ordered to tune to the target eNodeB.

The handover completion signaling is preferably enhanced with information about the ranked PPF instances and characteristics to facilitate a possible reselection of suitable transport path such as end-point pairs. With reference to the X2 handover sequence from 3GPP 23.401 below, the messages that need additional information is pointed out.

1 The target eNodeB such as the radio network node 111 sends message S1-AP: PATH SWITCH REQUEST. It contains the existing IE E-RABs To Be Switched in Uplink Item. The existing sub-IE TNL address identifies the serving PPF TNL end-point of each E-RAB. In addition, the serving PPF is identified by two new optional sub-IEs; ServingAreaID identifying the data center or area in which the PPF is located and ServingEntityInfo, a transparent vendor specific IE. It also contains a characteristics IE for the serving PPF. A new sub-IE DIEntityList contains the list of possible PPFs identified by the AreaID and/or EntityInfo and containing the path characteristics. If multi-path is used this would be an aggregated path cost.

2 SEE NEXT SEQUENCE

3 Once the target PPF instances s and GWs are allocated the downlink transmission is rerouted from the target GWs to the target PPF instances. The target PPF instance distributed the packets to all involved eNodeBs.

4 The MME indicates that the switch is complete.

5 The target eNodeB releases the resources in the source eNodeB.

6 The target eNodeB releases the resources in the source PPF instance.

Continuation:

1 If the S-GW shall be changed for one or more E-RABs, based on he the provided DIEntityList and other parameters, the MME will allocate new target S-GWs using for instance the existing S11-AP: CREATE SESSION REQUEST message, but modification of the PDN GW will not be done yet.

2 The MME will send a new message S1-AP: PATH MODIFICATION REQUEST to the target eNodeB including all E-RABs to be modified and the new target GW TNL address and GTP TEID for each E-RAB. It will also include an IE PreferredDIEntity identifying the preferred PPF the from the list provided by the target eNodeB in the previous sequence.

3 For each modified E-RAB the target eNodeB such as the radio network node 112 will allocate a new resource in the preferred PPF instance using some suitable message. The message includes the DL TNL address and GTP TEID for each involved eNodeB/SeNB and the target GW information and other parameters e.g. for security. If resources cannot be allocated in the preferred PPF instance the eNodeB may attempt another PPF instance according to some cost algorithm with the target GW as CN anchor. This sequence is not covered here. If no PPF instance can be found the existing PPF instance will be kept, if the CN has not ordered a release in this case.

4 The PPF will return its own UL TNL address and GTP TEID for each involved path as well as a DL forwarding TNL address and GTP TEID. The target eNodeB will modify its resources to expect traffic from the target PPF instance.

5 A message is sent to each SeNB to order it to modify its resources to expect traffic from the target PPF and modify the source PPF instance to forward traffic to the target PPF instance. Note that this is optional. The SeNB may easily accept traffic from any source and use that source for UL traffic. This requires that the link is secure to avoid eavesdropping and similar.

6 The source PPF instance will be order to forward packets to the target PPF instance using the DL FW address and TEID.

7 The target eNodeB will respond to the modification specifying the TNL address and GTP TEID of the target PPF for each modified E-RAB. Only E-RABs for which a new PPF was allocated are included.

8 For each E-RAB the MME will then modify the session including the TNL address and GTP TEID of the target PPF. At this point the Target GW will modify the PDN GW.

The continuation is the same as today.

Option 2:

During the handover preparation phase the first part of the sequence is the same as for OPTION 1:

The preparation phase continues per the sequence below:

1 The target eNodeB such as the radio network node 112 sends for instance a modified S1-AP: E-RAB Modification Indication to the MME. For each accepted E-RAB the serving PPF is identified by ServingAreaID and ServingEntityId and the characteristics of the path from the new TP, via internal target eNodeB resources, to the serving PPF is included. A list of possible PPF instances is included in IE DIEntityInfo together with characteristics. Each one is similarly identified by AreaID and EntityId and the path characteristics are included. If multi-path is used this would be an aggregated path cost.

2 If the S-GW shall be changed for one or more E-RABs the MME will allocate new target S-GWs using existing S11-AP: CREATE SESSION REQUEST but modification of the PDN GW will not be done here.

3 The MME responds with a modified S1-AP: E-RAB Modification Confirmation including, for every modified E-RAB, the TNL address and GTP TEID of new S-GW, and a preferred PPF instance.

4 For each modified E-RAB the target eNodeB allocates the preferred PPF instance. If this is not possible the eNodeB may reattempt with some other PPF instance. This is not covered here. As in option 1 the target eNodeB modifies its internal resources to expect traffic from the new PPF instance. The same reconfiguration is also done towards any SeNB.

5 The target eNodeB responds with X2-AP: HANDOVER REQUEST ACKNOWLEDGE, including the target PPF TNL address and GTP TEID for each accepted E-RAB.

6 The source eNodeB modifies the serving PPF to forward traffic to the target PPF instance and the target PPF instance will forward to the target eNodeB resource.

The handover completion signaling is in this case straight forward.

1 A Path Switch Request is sent to the MME containing the address and TEID of the PPF for each E-RAB. Information required for reselection is still included in case the CN state has changed.

2 For each modified E-RAB a S11-AP: Modify Session Request is sent to the new target GW, selected during preparation. The GW modifies the bearer in the PDN GW to route new traffic to the target GW. For unmodified E-RABs the MME will take no action.

The continuation is the same as in option 1. As the selection is already agreed it is not envisioned that the MME will reselect GW at this point. If it does the handling would be the same as in option 1.

Option 3:

In this option the RAN such as RAN 102 performs a speculative reselection early based on known CN end-points or alternatively only considering what is best from a RAN point of view i.e. the path cost between eNodeB/SeNBs and available PPFs. The CN 104 may trigger a second reselection.

During the handover preparation phase the first part of the sequence is the same as for OPTION 1.

Following the cost estimation and validation:

1 For each E-RAB to be setup the target eNodeB such as the radio network node 111 determines the best PPF instance from a RAN point of view. If there is knowledge of CN end-points i.e. available GWs, RAN may include assumed characteristics of these end-points in the algorithm. Note however that the CN may still decide to make a different allocation based on parameters not available to the RAN, such as load for instance. The RAN may also simply decide to assume that the CN will not change GWs. The target eNodeB will then allocate new PPF instances and inform any SeNBs.

The continuation is the same as for option 2, step 5 and onwards.

The completion phase is identical to option 2.

According to embodiments herein the characteristics requirement of each data stream between radio network node 111 and the CN 104 are fulfilled, and also embodiments herein maximize the number of data streams between radio network node 111 and the CN 104 fulfilling the characteristics requirement of the streams, in a network where a radio network node 111 comprises multiple endpoints such as antenna endpoints.

Figure 29:
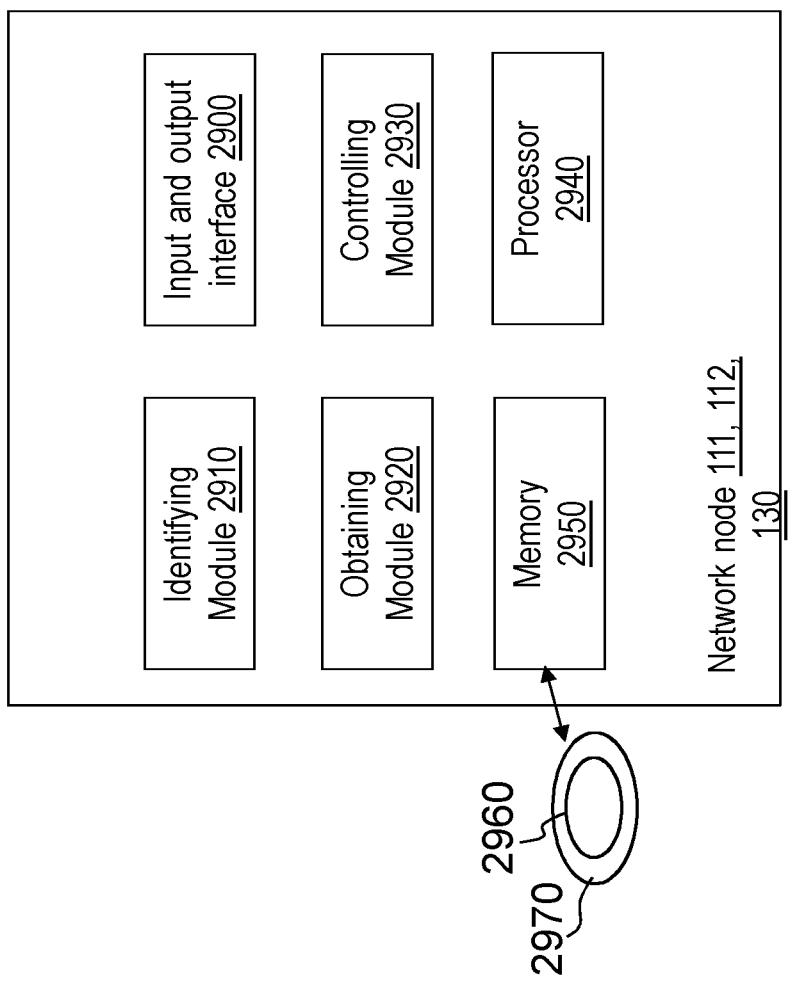
FIG. 29 is a schematic block diagram illustrating embodiments of a network node.

To perform the method actions for controlling whether or not to change a transport path for a user plane session in a radio communications network 100, the network node 111, 112, 130 may comprise the following arrangement depicted in FIG. 29. The path is adapted to prolong along a first part between an antenna endpoint of a network node 111 and a PPF instance PPF1, PPF2, PPF3 serving the network node 111 and a second part between the PPF instance PPF1, PPF2, PPF3 and the CN endpoint 1411, 1412, 1421.

The network node 111, 112, 130 comprises an input and output interface 2900 configured to communicate, with the wireless device 120, the PPF instances PPF1, PPF2, PPF3, one or more network nodes such as radio network nodes and core network nodes, e.g. the first and/or second gateway node 141, 142, RAN nodes such as the Network node 111, 112, 130, and/or O&M nodes. The input and output interface 2900 may comprise a receiver (not shown) and a transmitter (not shown). The radio network node 111, 112 may also comprise one or more PPF instances and one or more PPF instances have interfaces (RAN endpoint) which is pooled between eNBs such as the radio network node 111 and the second network node 112.

The network node 111, 112, 130 is configured to, e.g. by means of an identifying module 2910 configured to identify available CN endpoints 1411, 1412, 1421 in the CN 104, available PPF instances PPF1, PPF2, PPF3 in the RAN 102, and of available antenna endpoints 1111, 1112, 1121, 1122 in the RAN 102. The available CN endpoints 1411, 1412, 1421, available PPF instances PPF1, PPF2, PPF3 and available antenna endpoints 1111, 1112, 1121, 1122 are adapted to be available for the user plane session and comprise a number of possible transport paths for the user plane session.

The network node 111, 112, 130 is further configured to, e.g. by means of an obtaining module 2920 configured to obtain characteristics of available first parts of the possible transport paths, and characteristics of available second parts of the possible transport paths.

The network node 111, 112, 130 is further configured to, e.g. by means of an controlling module 2930 configured to, when detecting a change event related to the user plane session, control whether or not to change the transport path to any of the a number of possible transport paths for the user plane session based on the obtained characteristics of available first parts of the transport path, and characteristics of available second parts of the transport path.

The characteristics of the available first parts of the transport path, and the characteristics of the available second parts of the transport path may be adapted to be obtained in advance of any change event related to the user plane session.

The characteristics of the available first parts of the transport path, and characteristics of the available second parts of the transport path may as an alternative be adapted to be obtained during the detected change event related to the user plane session.

The characteristics of any one or more out of: the available first parts of the transport path and the available second parts of the transport, may be adapted to relate to: any one or more out of:

latency of said first part and/or second part, obtainable bandwidth of said first part and/or second part, number of active sessions in said first part and/or second part, bandwidth usage of said first part and/or second part, monetary transmission cost of said first part and/or second part, and any variables which provides preference of said first part and/or second part.

In some embodiments, the characteristics of the available first parts of the transport path, and characteristics of the available second parts of the transport may be adapted to relate to latency. In these embodiments, the network node 111, 112, 130 may further be configured to control whether or not to change the transport path to any of the a number of possible transport paths for the user plane session based on selecting the transport path with lowest delay.

In some embodiments, the characteristics of the available first parts of the transport path, and characteristics of the available second parts of the transport are adapted to relate to bandwidth. In these embodiments, the network node 111, 112, 130 may further be configured to control whether or not to change the transport path to any of the a number of possible transport paths for the user plane session, based on selecting the transport path with broadest bandwidth.

In some embodiments, the characteristics of the available first parts of the transport path, and characteristics of the available second parts of the transport are adapted to relate to latency and bandwidth. In these embodiments, the network node 111, 112, 130 may further is configured to control whether or not to change the transport path to any of the a number of possible transport paths for the user plane session, based on selecting a transport path with lowest delay and broadest bandwidth.

The detected change event adapted to relate to the user plane session may e.g. comprise any one or more out of:

A handover decision, adding a carrier related to carrier aggregation and setting up or changing a dual connectivity, a change of PPF instance PPF1, PPF2, PPF3 initiated by the network node 111 due to changes of characteristics, and a change of PPF instance PPF1, PPF2, PPF3 initiated by a core network node 130 due to changes of characteristics.

In some embodiments, any one or more out of the characteristics of the available first parts of the possible transport paths, and the characteristics of the available second parts of the possible transport paths, may be adapted to be obtained in any one out of:

A static configuration, wherein the characteristics are stored in a data base 150 when a new available CN endpoint 1411, 1412, 1421, available PPF instance PPF1, PPF2, PPF3 and/or available antenna endpoint is introduced, and an autonomous configuration, wherein the characteristics are obtained by a) obtaining measurements of the respective available first part and second part of the number of possible transport paths, b) matching identities related to the characteristics of the respective available CN endpoints 1411, 1412, 1421, available PPF instances PPF1 171, PPF2 172, PPF3 173, and/or available antenna endpoints.

The embodiments herein for controlling whether or not to change a transport path for a user plane session in a radio communications network 100, the network node 111, 112, 130 may be implemented through one or more processors, such as a processor 2940 of a processing circuitry in the network node 111, 112, 130 depicted in FIG. 29, together with computer program code for performing the functions and actions of the embodiments herein. The program code mentioned above may also be provided as a computer program product, for instance in the form of a data carrier carrying computer program code for performing the embodiments herein when being loaded into network node 111, 112, 130. One such carrier may be in the form of a CD ROM disc. It is however feasible with other data carriers such as a memory stick. The computer program code may furthermore be provided as pure program code on a server and downloaded to the network node 111, 112, 130.

The network node 111, 112, 130 may further comprise a memory 2950 comprising one or more memory units. The memory 2950 comprises instructions executable by the processor 2940.

The memory 2950 is arranged to be used to store e.g. identifiers of any one or more out of: the available CN endpoints 1411, 1412, 1421, available antenna endpoints 1111, 1112, 1121, 1122, first and second parts of transport paths, CN/RAN endpoint pairs, configuration information, feedback, data, and applications to perform the methods herein when being executed in the network node 111, 112, 130.

In some embodiments, a computer program 2960 comprises instructions, which when executed by the at least one processor 2940, cause the at least one processor 2940 to perform actions according to any of the Actions 1801-1806.

In some embodiments, a carrier 2970 comprises the computer program 2960, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the network node 111, 112, 130, described above may refer to a combination of analog and digital circuits, and/or one or more processors configured with software and/or firmware, e.g. stored in the memory 2950, that when executed by the one or more processors such as the processor 2940 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method performed by a network node for controlling whether or not to change a transport path for a user plane session in a radio communications network, which path prolongs along:

a first part between an antenna endpoint of a network node and a Packet Processing Function (PPF) instance serving the network node and a second part between the PPF instance and a Core Network (CN) endpoint, the method comprising:

identifying available CN endpoints in a CN, available PPF instances in a Radio Access Network (RAN) and of available antenna endpoints in the RAN, which available CN endpoints, available PPF instances and available antenna endpoints are available for the user plane session and comprises a number of possible transport paths for the user plane session;

obtaining characteristics of available first parts of the possible transport paths, and characteristics of available second parts of the possible transport paths; and when detecting a change event related to the user plane session, controlling whether or not to change the transport path to any of the a number of possible transport paths for the user plane session based on the obtained characteristics of available first parts of the transport path, and characteristics of available second parts of the transport path.

2. The method according to claim 1, wherein the characteristics of the available first parts of the transport path, and the characteristics of the available second parts of the transport path are obtained in advance of any change event related to the user plane session.

3. The method according to claim 1, wherein the characteristics of the available first parts of the transport path, and the characteristics of the available second parts of the transport path are obtained during the detected change event related to the user plane session.

4. The method according to claim 1, wherein the characteristics of any one or more out of: the available first parts of the transport path and the available second parts of the transport relate to any one or more out of:

latency of said first part, or second part, or both said first and second parts;
obtainable bandwidth of said first part, or second part, or both said first and second parts;
number of active sessions in said first part, or second part, or both said first and second parts;
bandwidth usage of said first part, or second part, or both said first and second parts;
monetary transmission cost of said first part, or second part, or both said first and second parts; and
any variables which provides preference of said first part, or second part, or both said first and second parts.

5. The method according to claim 1, wherein the characteristics of the available first parts of the transport path, and characteristics of the available second parts of the transport relate to latency, and wherein controlling whether or not to change the transport path to any of the a number of possible transport paths for the user plane session is based on selecting the transport path with lowest delay.

6. The method according to claim 1, wherein the characteristics of the available first parts of the transport path, and characteristics of the available second parts of the transport relate to bandwidth, and wherein controlling whether or not to change the transport path to any of the a number of possible transport paths for the user plane session is based on selecting the transport path with broadest bandwidth.

7. The method according to claim 1, wherein the characteristics of the available first parts of the transport path, and characteristics of the available second parts of the transport relate to latency and bandwidth, and wherein controlling whether or not to change the transport path to any of the a number of possible transport paths for the user plane session is based on selecting a transport path with lowest delay and broadest bandwidth.

8. The method according to claim 1, wherein the detected change event related to the user plane session comprises any one or more out of:
a handover decision;
adding a carrier related to carrier aggregation and setting up or changing a dual connectivity;
a change of PPF instance initiated by the network node due to changes of characteristics; and
a change of PPF instance initiated by a core network node due to changes of characteristics.

9. The method according to claim 1, wherein the characteristics of available first parts of the possible transport paths, and characteristics of the available second parts of the possible transport paths, are obtained in any one out of:
a static configuration, wherein the characteristics are stored in a data base when one or more of a new available CN endpoint, available PPF instance, and available antenna endpoint is introduced; and
an autonomous configuration, wherein the characteristics are obtained by:
(a) obtaining measurements of the respective available first part and second part of the number of possible transport paths; and
(b) matching identities related to the characteristics of one or more of the respective available CN endpoints, available PPF instances, and available antenna endpoints.

10. A non-transitory computer readable storage medium, having stored thereon a computer program comprising instructions which, when executed by a processor, are capable of causing the processor to perform operations for a network node to control whether or not to change a transport path for a user plane session in a radio communications network, which path prolongs along:
a first part between an antenna endpoint of a network node and a Packet Processing Function (PPF) instance serving the network node and
a second part between the PPF instance and a Core Network (CN) endpoint,
the operations comprising:
identifying available CN endpoints in a CN, available PPF instances in a Radio Access Network (RAN) and of available antenna endpoints in the RAN, which available CN endpoints, available PPF instances and available antenna endpoints are available for the user plane session and comprises a number of possible transport paths for the user plane session;
obtaining characteristics of available first parts of the possible transport paths, and characteristics of available second parts of the possible transport paths; and
when detecting a change event related to the user plane session, controlling whether or not to change the transport path to any of the a number of possible transport paths for the user plane session based on the obtained characteristics of available first parts of the transport path, and characteristics of available second parts of the transport path.

11. A network node for controlling whether or not to change a transport path for a user plane session in a radio communications network, which path is adapted to prolong along:
a first part between an antenna endpoint of a network node and a Packet Processing Function (PPF) instance serving the network node, and
a second part between the PPF instance and a Core Network (CN) endpoint,
the network node being configured to:
identify available CN endpoints in a CN, available PPF instances in a Radio Access Network (RAN), and of available antenna endpoints in the RAN, which available CN endpoints, available PPF instances and available antenna endpoints are adapted to be available for the user plane session and comprise a number of possible transport paths for the user plane session;
obtain characteristics of available first parts of the possible transport paths, and characteristics of available second parts of the possible transport paths; and
when detecting a change event related to the user plane session, control whether or not to change the transport path to any of the a number of possible transport paths for the user plane session based on the obtained characteristics of available first parts of the transport path, and characteristics of available second parts of the transport path.

12. The network node according to claim 11, wherein the characteristics of the available first parts of the transport path, and the characteristics of the available second parts of the transport path are adapted to be obtained in advance of any change event related to the user plane session.

13. The network node according to claim 11, wherein the characteristics of the available first parts of the transport path, and characteristics of the available second parts of the transport path are adapted to be obtained during the detected change event related to the user plane session.

14. The network node according to claim 11, wherein the characteristics of any one or more out of: the available first parts of the transport path and the available second parts of the transport, are adapted to relate to: any one or more out of:

latency of said first part, or second part, or both said first and second parts;

obtainable bandwidth of said first part, or second part, or both said first and second parts;

number of active sessions in said first part, or second part, or both said first and second parts;

bandwidth usage of said first part, or second part, or both said first and second parts;

monetary transmission cost of said first part, or second part, or both said first and second parts; and any variables which provides preference of said first part, or second part, or both said first and second parts.

15. The network node according to claim 11, wherein the characteristics of the available first parts of the transport path, and characteristics of the available second parts of the transport are adapted to relate to latency and wherein the network node further is configured to control whether or not to change the transport path to any of the a number of possible transport paths for the user plane session based on selecting the transport path with lowest delay.

16. The network node according to claim 11, wherein the characteristics of the available first parts of the transport path, and characteristics of the available second parts of the transport are adapted to relate to bandwidth, and wherein the network node further is configured to control whether or not to change the transport path to any of the a number of possible transport paths for the user plane session, based on selecting the transport path with broadest bandwidth.

17. The network node according to claim 11, wherein the characteristics of the available first parts of the transport path, and characteristics of the available second parts of the transport are adapted to relate to latency and bandwidth, and wherein the network node further is configured to control whether or not to change the transport path to any of the a number of possible transport paths for the user plane session, based on selecting a transport path with lowest delay and broadest bandwidth.

18. The network node according to claim 11, wherein the detected change event adapted to relate to the user plane session comprises any one or more out of:

a handover decision;

adding a carrier related to carrier aggregation and setting up or changing a dual connectivity;

a change of PPF instance initiated by the network node due to changes of characteristics; and a change of PPF instance initiated by a core network node due to changes of characteristics.

19. The network node according to claim 11, wherein any one or more out of the characteristics of the available first parts of the possible transport paths, and the characteristics of the available second parts of the possible transport paths, are adapted to be obtained in any one out of:

a static configuration, wherein the characteristics are stored in a data base when one or more of a new available CN endpoint, available PPF instance and available antenna endpoint is introduced; and an autonomous configuration, wherein the characteristics are obtained by:

(a) obtaining measurements of the respective available first part and second part of the number of possible transport paths; and (b) matching identities related to the characteristics of one or more of the respective available CN endpoints, available PPF instances, and available antenna endpoints.

\* \* \* \* \*